United States Patent
Ha

(10) Patent No.: US 10,949,671 B2
(45) Date of Patent: Mar. 16, 2021

(54) AUGMENTED REALITY SYSTEM CAPABLE OF MANIPULATING AN AUGMENTED REALITY OBJECT AND AN AUGMENTED REALITY METHOD USING THE SAME

(71) Applicant: VIRNECT inc., Naju-si (KR)

(72) Inventor: Tae Jin Ha, Naju-si (KR)

(73) Assignee: VIRNECT INC., Naju-si (KR)

( * ) Notice: Subject to any disclaimer, the term of this patent is extended or adjusted under 35 U.S.C. 154(b) by 0 days.

(21) Appl. No.: 16/531,036

(22) Filed: Aug. 3, 2019

(65) Prior Publication Data
US 2021/0034870 A1 Feb. 4, 2021

(51) Int. Cl.
| | |
|---|---|
| G06T 19/00 | (2011.01) |
| G06K 9/00 | (2006.01) |
| G06T 7/70 | (2017.01) |
| G06K 9/32 | (2006.01) |
| G06T 7/38 | (2017.01) |
| G06T 7/579 | (2017.01) |
| G06F 3/01 | (2006.01) |

(52) U.S. Cl.
CPC ......... G06K 9/00671 (2013.01); G06F 3/011 (2013.01); G06K 9/325 (2013.01); G06T 7/38 (2017.01); G06T 7/579 (2017.01); G06T 7/70 (2017.01); G06T 19/006 (2013.01)

(58) Field of Classification Search
CPC ......... G06T 19/006; G06T 7/38; G06T 7/579; G06T 19/20; G06K 9/00671
See application file for complete search history.

(56) References Cited

U.S. PATENT DOCUMENTS

| | | | | |
|---|---|---|---|---|
| 9,087,395 | B1* | 7/2015 | Amacker | G06T 13/00 |
| 9,588,651 | B1* | 3/2017 | Buchanan | G06T 15/00 |
| 2011/0265018 | A1* | 10/2011 | Borst | A63F 13/79 |
| | | | | 715/757 |
| 2011/0296324 | A1* | 12/2011 | Goossens | G06F 3/04883 |
| | | | | 715/763 |
| 2012/0075424 | A1* | 3/2012 | Kawamoto | G06T 19/006 |
| | | | | 348/46 |
| 2012/0216114 | A1* | 8/2012 | Privault | G06F 3/04883 |
| | | | | 715/702 |
| 2012/0320080 | A1* | 12/2012 | Giese | G06F 3/017 |
| | | | | 345/619 |
| 2013/0117025 | A1* | 5/2013 | Park | G06K 9/00704 |
| | | | | 704/260 |
| 2013/0136313 | A1* | 5/2013 | Maeda | G06K 9/00577 |
| | | | | 382/111 |

(Continued)

FOREIGN PATENT DOCUMENTS

| | | | |
|---|---|---|---|
| KR | 1020150114106 A | 10/2015 | |
| KR | 1020160092292 A | 8/2016 | |
| WO | WO-2018104834 A1 * | 6/2018 | G06F 3/0304 |

Primary Examiner — Sultana M Zalalee
(74) Attorney, Agent, or Firm — STIP Law Group, LLC

(57) ABSTRACT

An augmented reality system according to the present invention comprises a mobile terminal which, in displaying a 3D virtual image on a display, displays a dotted guide along the boundary of characters displayed on the display and when handwriting is detected along the dotted guide, recognizes the characters and displays a virtual object corresponding to the content of the characters, wherein, if the virtual object is touched, a pre-configured motion of the virtual object corresponding to the touched area is reproduced.

5 Claims, 22 Drawing Sheets

(56) References Cited

U.S. PATENT DOCUMENTS

| | | | | |
|---|---|---|---|---|
| 2013/0194164 A1* | 8/2013 | Sugden | G02B 27/017 | 345/8 |
| 2013/0257907 A1* | 10/2013 | Matsui | G09G 5/377 | 345/633 |
| 2013/0278631 A1* | 10/2013 | Border | G02B 27/017 | 345/633 |
| 2013/0314320 A1* | 11/2013 | Hwang | G06F 3/0346 | 345/158 |
| 2014/0125678 A1* | 5/2014 | Wang | A63F 13/005 | 345/473 |
| 2014/0126775 A1* | 5/2014 | Kakino | G06K 9/00 | 382/103 |
| 2014/0233787 A1* | 8/2014 | Hellman | G06K 9/00355 | 382/103 |
| 2015/0089414 A1* | 3/2015 | Park | G06F 3/04847 | 715/765 |
| 2015/0127430 A1* | 5/2015 | Hammer, III | G06Q 10/087 | 705/7.35 |
| 2015/0135093 A1* | 5/2015 | Zhou | G06F 3/0486 | 715/748 |
| 2015/0146925 A1* | 5/2015 | Son | G06K 9/00624 | 382/103 |
| 2015/0258432 A1* | 9/2015 | Stafford | A63F 13/213 | 463/32 |
| 2016/0125646 A1* | 5/2016 | Oka | G06T 15/04 | 345/420 |
| 2016/0133051 A1* | 5/2016 | Aonuma | G06T 19/006 | 345/633 |
| 2016/0358380 A1* | 12/2016 | Yeom | G06T 19/006 | |
| 2017/0280188 A1* | 9/2017 | Mullins | H04N 21/4302 | |
| 2017/0352187 A1* | 12/2017 | Haines | G06F 16/48 | |
| 2017/0359740 A1* | 12/2017 | Dintenfass | H04W 4/18 | |
| 2018/0005435 A1* | 1/2018 | Anderson | G06T 19/006 | |
| 2018/0011610 A1* | 1/2018 | Ragan, Jr. | G06F 40/174 | |
| 2018/0129276 A1* | 5/2018 | Nguyen | G06T 11/00 | |
| 2018/0165518 A1* | 6/2018 | Assaf | G06K 9/00671 | |
| 2018/0210628 A1* | 7/2018 | McPhee | G06F 3/04815 | |
| 2018/0322681 A1* | 11/2018 | Inomata | A63F 13/211 | |
| 2018/0350144 A1* | 12/2018 | Rathod | H04W 4/029 | |
| 2019/0347061 A1* | 11/2019 | Morris | G06Q 10/101 | |
| 2020/0005026 A1* | 1/2020 | Andersen | A63F 13/428 | |
| 2020/0043243 A1* | 2/2020 | Bhushan | G06T 19/006 | |

* cited by examiner

AUGMENTED REALITY SYSTEM CAPABLE OF MANIPULATING AN AUGMENTED REALITY OBJECT AND AN AUGMENTED REALITY METHOD USING THE SAME

BACKGROUND

Technical Field

The present invention relates to an augmented reality system and, more particularly, to an augmented reality system capable of recognizing handwriting of characters and manipulating augmented reality objects by using 3D pose information.

Related Art

Recently, researches are actively conducted on provision of interactive contents based on the augmented reality technique that shows the physical world overlaid with various pieces of information when a camera module captures a scene of the physical world.

Augmented Reality (AR) belongs to the field of Virtual Reality (VR) technology and is a computer technique that makes a virtual environment interwoven with the real-world environment perceived by the user, by which the user feels as if the virtual world actually exists in the original physical environment.

Different from the conventional virtual reality that deals with only the virtual space and objects, AR superimposes virtual objects on the physical world base, thereby providing information augmented with additional information, which is hard to be obtained only from the physical world.

In other words, augmented reality may be defined as the reality created by blending real images as seen by the user and a virtual environment created by computer graphics, for example, a 3D virtual environment. Here, the 3D virtual environment may provide information necessary for real images as perceived by the user, where 3D virtual images, being blended with real images, may enhance the immersive experience of the user.

Compared with pure virtual reality techniques, augmented reality provides real images along with a 3D virtual environment and makes the physical world interwoven with virtual worlds seamlessly, thereby providing a better feeling of reality.

To exploit the advantages of augmented reality, research/development is now actively being conducted around the world on the techniques employing augmented reality. For example, commercialization of augmented reality is under progress in various fields including broadcasting, advertisement, exhibition, game, theme park, military, education, and promotion.

Due to improvement of computing power of mobile devices such as mobile phones, Personal Digital Assistants (PDAs), and Ultra Mobile Personal Computers (UMPCs); and advances of wireless network devices, mobile terminals of today have been improved so as to implement a handheld augmented reality system.

As such a system has become available, a plurality of augmented reality applications based on mobile devices have been developed. Moreover, as mobile devices are spread quite rapidly, an environment in which a user may experience augmented reality applications is being constructed accordingly.

In addition, user demand is increasing on various additional services based on augmented reality for their mobile terminal, and attempts are increasing to apply various augmented reality contents for users of mobile terminals.

The Korean public patent No. 10-2016-0092292 is related to a "system and method for providing augmented reality service of materials for promotional objects" and proposes a system that advertises a target object effectively by applying augmented reality to advertisement content to allow people exposed to the advertisement to easily obtain information related to the advertisement object and learn the details thereof by being immersed with interest.

Meanwhile, various types of wearable devices that may be attached to the body of a user are released on the market. In particular, a system is being developed, in which mobile and transparent display technologies are applied to glasses, and a user may check various pieces of information through the glasses.

Referring to FIG. 4 of prior art reference 1 (KR10-2015-0114106A), an augmented reality module may display a command received from a central control unit on the augmented reality glasses, show a travel path received from a navigation module on the augmented reality glasses according to the 5 dimensional coordinates received from a coordinate calculation module, and if a field manager approaches target equipment within a predetermined distance, receive a manual or other necessary document from the database of the equipment and display the received manual or other document on the augmented reality glasses while indicating the target equipment by using an arrow or other means.

However, to develop such an augmented reality manual, a software development company has to be involved as in the development of general-purpose software, and final augmented reality manual software may only be produced after a series of complicated processes including planning, design, development, and stabilization.

Therefore, it takes a considerable time to develop a manual, and moreover, each time equipment is updated, a new augmented reality manual has to be developed again.

Since conventional augmented reality systems display too many virtual objects on the transparent display of the glasses, the user may be easily get distracted, and due to this reason, it causes a problem that the user has a difficulty in recognizing necessary information.

Also, since, when a plurality of physical objects have similar appearance, multiple objects may be recognized to be the same object, or an unassigned virtual object may be displayed to cause a confusion, a method for identifying similar objects and preventing multiple recognition is required.

Also, a method is required, which is capable of identifying a physical object correctly even if the physical object is fully or partially contained in a captured image and displaying a virtual object assigned to the physical object at a target position.

Also, when a user attempts to translate/rotate a virtual object by activating augmented reality features of a mobile terminal, the user has to manipulate the virtual object by touching a touchscreen of the mobile terminal by using the user's finger.

Also, since a touchscreen (display) only provides 2D coordinates of touch points of the finger, a virtual object may be moved in the horizontal or vertical direction on the 2D plane.

And in the case of rotation, too, a virtual object may be rotated around a 1D axis through a finger gesture.

Therefore, conventionally, since only limited 1D or 2D manipulations are allowed, it is difficult to efficiently manipulate a virtual object in 3D. To manipulate a virtual object to have various poses, since translation or rotation mode has to be changed frequently and a plurality of manipulations are inevitably involved, a considerable time is required, and fingers have to be manipulated heavily.

PRIOR ART REFERENCES

Patent Reference (Patent reference 1) KR10-2015-0114106 A

SUMMARY OF THE INVENTION

The present invention has been made in an effort to solve the technical problem above and provides an augmented reality system capable of capturing a manipulation video of a process where a user operates a physical object in an augmented reality manual generation mode; and displays the manipulation video as an augmented reality superimposed on a physical object in an augmented reality manual execution mode.

Also, the present invention has been made in an effort to solve the technical problem above and provides an augmented reality system capable of determining an additional recognition area and identifying similar objects by assigning unique identifiers to the respective physical objects based on an image difference of the additional recognition area.

At this time, the present invention provides an augmented reality system capable of identifying physical objects by taking into account all of the unique identifiers assigned to the respective physical objects based on the image difference of the additional recognition area and current position information of each physical object.

Also, the present invention has been made in an effort to solve the technical problem above and provides an augmented reality system capable of displaying a virtual object assigned to a physical object at a target position by identifying the physical object correctly even if the physical object is partially contained in a captured image.

Also, the present invention has been made in an effort to solve the technical problem above and provides an augmented reality system in which the amount of information of a virtual object is automatically adjusted dynamically according to the distance between a physical object and a user.

Also, the present invention has been made in an effort to solve the technical problem above and provides an augmented reality system in which positions of objects are automatically adjusted according to a position relationship between a physical and virtual objects so that objects are not overlapped with each other.

Also, the present invention has been made in an effort to solve the technical problem above and provides an augmented reality system in which a dotted guide is displayed along the boundary of displayed characters and if handwritten characters are detected along the dotted line, characters are recognized, and a virtual object corresponding to the content of the characters is displayed.

Also, the present invention has been made in an effort to solve the technical problem above and provides an augmented reality system in which poses of at least one or more selected virtual objects may be changed by being synchronized with 3D pose information of a mobile terminal.

Also, the present invention provides an augmented reality system capable of determining an additional recognition area and identifying similar objects by assigning unique identifiers to the respective physical objects based on an image difference of the additional recognition area.

According to an embodiment of the present invention to solve the technical problem above, an augmented reality system may comprise a mobile terminal which, in displaying a 3D virtual image on a display, displays a dotted guide along the boundary of characters displayed on the display and when handwriting is detected along the dotted guide, recognizes the characters and displays a virtual object corresponding to the content of the characters, wherein, if the virtual object is touched, a pre-configured motion of the virtual object corresponding to the touched area is reproduced.

Also, in the augmented reality system, the mobile terminal may be equipped with a 9-axis sensor and obtains its own 3D pose information, and the pose of at least one or more virtual objects selected through the mobile terminal may be changed by being synchronized with the 3D pose information.

According to another embodiment of the present invention, an augmented reality system may comprise a terminal which is equipped with a video camera that captures a scene in the surroundings of a user and provides actual image information; and in displaying a 3D virtual image on a display, which displays the 3D virtual image corresponding to current position information and the actual image information on the display, wherein the mobile terminal displays characters corresponding to the name of the 3D virtual image on the display, displays a dotted guide along the boundary of the characters and when handwriting is detected along the dotted guide, recognizes the characters, and displays a virtual object corresponding to the content of the characters, wherein, if the virtual object is touched, a pre-configured motion of the virtual object corresponding to the touched area is reproduced.

Also, in the augmented reality system, the mobile terminal may be equipped with a 9-axis sensor and obtains its own 3D pose information, and the pose of at least one or more virtual objects selected through the mobile terminal may be changed by being synchronized with the 3D pose information.

According to yet another embodiment of the present invention, an augmented reality system may comprise a mobile terminal which is equipped with a video camera that captures a scene in the surroundings of a user and provides actual image information; and in displaying a 3D virtual image on a display, which displays the 3D virtual image corresponding to current position information and the actual image information on the display; and a server that provides, to the mobile terminal, the 3D virtual image corresponding to the current position information and actual image information transmitted from the mobile terminal in real-time, wherein, in identifying a physical object of the actual image information and providing the mobile terminal with a virtual object of the 3D virtual image assigned to each identified physical object, the mobile terminal displays characters corresponding to the name of the 3D virtual image on the display, displays a dotted guide along the boundary of the characters and when handwriting is detected along the dotted guide, recognizes the characters and displays a virtual object corresponding to the content of the characters, wherein, if the virtual object is touched, a pre-configured motion of the virtual object corresponding to the touched area is reproduced, and the mobile terminal is equipped with a 9-axis sensor and obtains its own 3D pose information, and the pose of at least one or more virtual objects selected through the mobile terminal is changed by being synchronized with the 3D pose information.

Also, in the augmented reality system, coordinates of at least one or more virtual objects selected in the mobile terminal may be converted from spatial coordinate system expressing the actual image information to a mobile coordinate system for the mobile terminal, and coordinates of a virtual object released from selection may be converted from the mobile coordinate system for the mobile terminal to the spatial coordinate system expressing the actual image information.

According to still another embodiment of the present invention, an augmented reality system may comprise a mobile terminal which is equipped with a video camera that captures a scene in the surroundings of a user and provides actual image information; and in displaying a 3D virtual image on a display, which displays the 3D virtual image corresponding to current position information and the actual image information on the display, wherein the mobile terminal is equipped with a 9-axis sensor and obtains its own 3D pose information, and the pose of at least one or more virtual objects selected through the mobile terminal is changed by being synchronized with the 3D pose information.

According to still yet another embodiment of the present invention, an augmented reality system may comprise a mobile terminal which is equipped with a video camera that captures a scene in the surroundings of a user and provides actual image information; and in displaying a 3D virtual image on a display, which displays the 3D virtual image corresponding to current position information and the actual image information on the display; and a server that provides, to the mobile terminal, the 3D virtual image corresponding to the current position information and actual image information transmitted from the mobile terminal in real-time, wherein, in identifying a physical object of the actual image information and providing the mobile terminal with a virtual object of the 3D virtual image assigned to each identified physical object, the mobile terminal is equipped with a 9-axis sensor and obtains its own 3D pose information, and the pose of at least one or more virtual objects selected through the mobile terminal is changed by being synchronized with the 3D pose information.

Also, in the augmented reality system, a video showing attitude change of a virtual object in synchronization with 3D pose information of the mobile terminal may be stored for reproduction afterwards.

Also, in the augmented reality system, coordinates of at least one or more virtual objects selected in the mobile terminal may be converted from spatial coordinate system expressing the actual image information to a mobile coordinate system for the mobile terminal, and coordinates of a virtual object released from selection may be converted from the mobile coordinate system for the mobile terminal to the spatial coordinate system expressing the actual image information.

Also, in the augmented reality system, among a plurality of physical objects present in the actual image information, additional recognition regions may be determined by subtracting physical objects showing a predetermined degree of similarity from the corresponding actual image information, and unique identifiers may be assigned to the respective physical objects based on visual differences of additional recognition regions.

Also, in the augmented reality system, the server may identify physical objects by taking into account all of the unique identifiers assigned to the respective physical objects based on image difference of an additional recognition area and current position information of each physical object.

DESCRIPTION OF EXEMPLARY EMBODIMENTS

In what follows, embodiments of the present invention will be described in detail with reference to appended drawings so that those skilled in the art to which the present invention belongs may readily apply the technical principles of the present invention.

Figure 1:
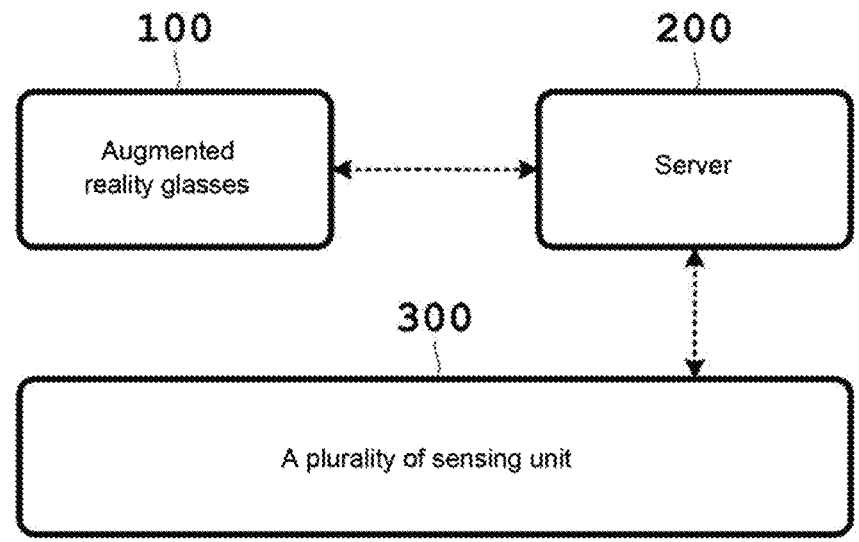
FIG. 1 illustrates a structure of an augmented reality system according to an embodiment of the present invention.

Referring to FIG. 1, the augmented reality system 1 comprises a mobile terminal 100, server 200, and a plurality of sensing units 300. Here, a plurality of sensing units 300 may be installed selectively at the augmented reality system 1 depending on embodiments.

In what follows, depending on embodiments, the mobile terminal 100 may be described only for augmented reality glasses 100, but descriptions specific to the augmented reality glasses 100 may be applied for all kinds of mobile terminals 100. However, although descriptions about techniques for displaying a 3D virtual image on a transparent display and providing a gesture-based interface are applied only to the augmented reality glasses 100, the remaining technical features may all be applied to the mobile terminal. On the other hand, descriptions about a touch-based augmented reality system may be applied only to touch-based terminals among mobile terminals.

The augmented reality glasses 100 are equipped with a video camera that captures a scene in the surroundings of a user and provides actual image information; and in displaying a 3D virtual image on a transparent display, display the 3D virtual image corresponding to the current position information and actual image information within the field of view of the user.

The server 200 provides, to the augmented reality glasses 100, a 3D virtual image corresponding to the current position information and actual image information transmitted from the augmented reality glasses 100 in real-time.

By default, the augmented reality glasses 100 are configured to provide satellite position information to the server 200 as the current position information. When a communication module is included in the augmented reality glasses 100, not only the satellite position information but also the position of a nearby Wi-Fi repeater, position of a base station, and so on may be additionally provided to the server as the current position information.

In particular, since it is often the case that the satellite position information is unavailable in indoor environments, the augmented reality glasses 100 may additionally detect signal strength of at least one or more Wi-Fi repeaters found and transmit the detected signal strength to the server 200. In other words, since the absolute positions of indoor Wi-Fi repeaters are pre-stored in the server 200, if the augmented reality glasses 100 additionally provide a unique number and signal strength of a searched Wi-Fi repeater, the server 200 may determine a relative travel path of the augmented reality glasses 100.

As described above, a relative distance between the augmented reality glasses 100 and Wi-Fi repeater may be determined from signal strength, and a travel direction may be calculated based on the change of signal strength with respect to a nearby Wi-Fi repeater. Additional methods for obtaining the current position information in an indoor environment are as follows.

Meanwhile, methods for identifying a physical object in an indoor environment may be largely divided into two types. The descriptions given below for identifying a physical object in an indoor environment deal with a terminal including the augmented reality glasses 100 as a representative example. The following descriptions may well be applied to the augmented reality glasses 100.

Figure 2A:
FIG. 2a illustrates augmented reality implemented based on object recognition.
Figure 2B:
FIG. 2b illustrates augmented reality implemented based on spatial recognition.

FIG. 2a illustrates augmented reality implemented based on object recognition, and FIG. 2b illustrates augmented reality implemented based on spatial recognition.

Referring to FIGS. 2a and 2b, image based learning is suitable for an object recognition-based method for identifying a physical object since object size is small relative to space. However, recognition is possible only when an object is included in the image, and recognition direction and distance may be restricted. Since the position of an object may be changed, it is a difficult task to pre-store the position of the object. It should be noted that object recognition-based 3D matched coordinate system (augmented reality matched coordinate system) is generated for each object.

Next, a spatial recognition-based method for identifying the position of a physical object by default applies Simultaneous Localization And Mapping (SLAM) technique. SLAM is a fundamental technique for autonomous navigation, which may be defined as a task that while moving around an unknown environment, a terminal (robot) constructs an accurate 3D map about the environment without an external support but only with sensors installed therein.

In other words, a spatial recognition-based method may be defined as a method that recognizes the space in 3D, generates a 3D matched coordinate system, and with reference to the 3D matched coordinate system, displays a pre-assigned virtual object at the coordinates of the corresponding physical object.

Therefore, even if an object is not contained within an image, a virtual object may be augmented on the object (physical object). However, if a terminal is moved from the initial recognition position, the spatial tracking error is accumulated, and thus augmented reality information (virtual object) may not be easily displayed at an appropriate position.

Therefore, the augmented reality system 1 of the present invention is configured to apply spatial and object recognition simultaneously for displaying virtual objects at their correct positions so that even if all or none of physical objects or part of the physical objects are present in a capture image, the physical objects may be identified accurately, and virtual objects assigned to the physical objects may be displayed at their target positions.

In other words, a terminal recognizes the space in 3D, generates a 3D spatial matched coordinate system, and with reference to the 3D spatial matched coordinate system, displays a pre-assigned virtual object at the coordinates of the corresponding physical object; each time a physical object of actual image information is visually recognized based on object recognition, coordinates of the physical object are determined, an object recognition-based 3D matched coordinate system is additionally generated, and the 3D spatial matched coordinate system is updated based on the object recognition-based 3D matched coordinate system.

Here, object recognition refers to a concept that considers visual recognition to be a process composed of four phases: Detection, Classification, Recognition, and Identification (DCRI).

Figure 3:
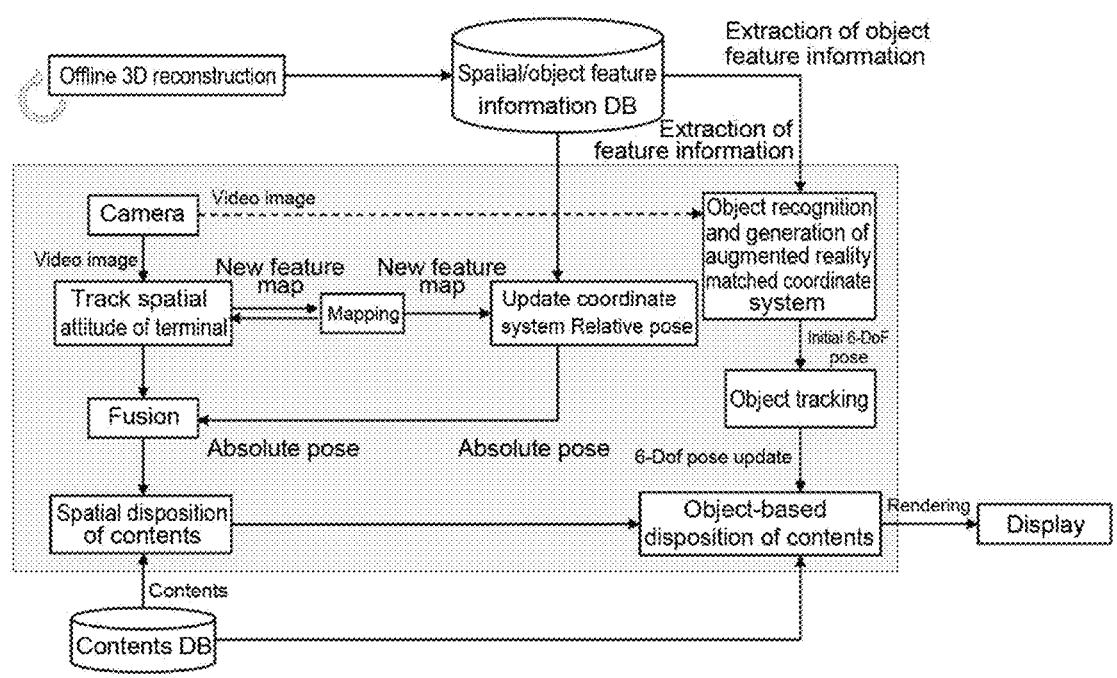
FIG. 3 illustrates an operation concept of an augmented reality system.
Figure 4:
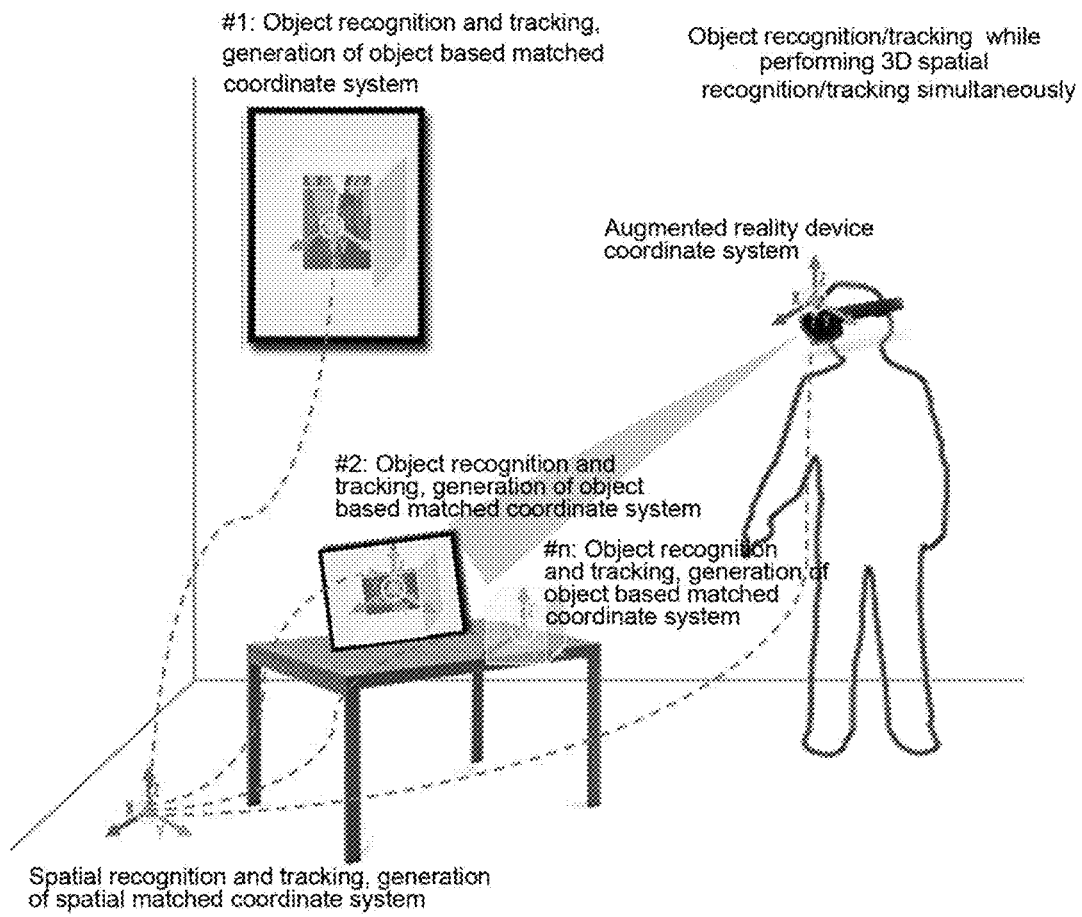
FIG. 4 illustrates operation status of an augmented reality system.

FIG. 3 illustrates an operation concept of an augmented reality system 1, and FIG. 4 illustrates operation status of the augmented reality system 1.

Referring to FIGS. 3 and 4, the operating principles of the augmented reality system 1 are described as follows.

First, if the augmented reality system 1 enters the space known from spatial recognition, the augmented reality system 1 may obtain, as augmented reality spatial information of the space, information about the augmented reality matched coordinate system, coordinates of the physical object, virtual object assigned to the coordinates of the physical object, and object recognition-based physical object identification information. For example, when a terminal enters the space, the terminal may receive and obtain, from a database of the server 200, augmented reality spatial information generated from pre-learning of the space based on the 3D matched coordinate system obtained based on spatial recognition.

And the terminal recognizes the space in 3D, generates a 3D spatial matched coordinate system, and displays a pre-assigned virtual object at the coordinates of each physical object within the augmented reality spatial information with reference to the 3D spatial matched coordinate system.

Therefore, even if a physical object does not exist or partially exist within a captured image, a virtual object assigned to the physical object may be displayed at its target position by using only the 3D spatial matched coordinate system.

At this time, each time a physical object of actual image information is visually recognized based on object recognition, the terminal may determine the coordinates of the physical object again, update the coordinates of the identified physical object, and display a pre-assigned virtual object to the updated coordinates of the physical object. In other words, by default, the position of a physical object is determined based on spatial recognition, and at the same time, object recognition is applied to further identify the physical object, after which the position coordinates of the identified physical object may be updated.

Meanwhile, the terminal recognizes the space in 3D, generates a 3D spatial matched coordinate system, and displays each pre-assigned virtual object to the coordinates of the corresponding physical object with reference to the 3D spatial matched coordinate system; at this time, each time a physical object of actual image information is visually recognized based on object recognition, the terminal determines the coordinates of the physical object, additionally generates an object recognition-based 3D matched coordinate system, and updates the 3D spatial matched coordinate system with reference to the object recognition-based 3D matched coordinate system.

In other words, each time a physical object is identified based on object recognition, a 3D spatial matched coordinate system may be estimated and compensated based on the coordinates of the physical object.

At this time, if a plurality of physical objects are detected based on object recognition, individual physical objects may be identified by employing an additional recognition region. Detailed descriptions of identifying similar objects will be described later.

As shown in FIG. 4, each time an object (physical object) is visually recognized based on object recognition, object recognition-based 3D matched coordinate system (#n) is additionally generated and a 3D spatial matched coordinate system is updated based thereon, by which the accumulated error in the 3D spatial matched coordinate system due to movement of the terminal may be compensated.

At this time, if a plurality of objects (physical objects) are visually recognized, the terminal may detect position changes of the physical objects by taking into account relative positions among them.

Therefore, the terminal may not only confirm whether a physical object has changed its position through the 3D spatial matched coordinate system but also detect the position change of the physical object by additionally taking into account the relative positions among individual physical objects.

While performing 3D spatial position recognition (SLAM algorithm), the augmented reality system 1 simultaneously recognizes/tracks objects for interaction and matches contents in parallel.

First, while performing the 3D spatial learning (SLAM algorithm), the terminal generates an augmented reality matched coordinate system in the space. Next, pose (translation and rotation) of the terminal is tracked with reference to the spatial matched coordinate system; if a pre-learned space is recognized from the database, a predefined augmented reality matched coordinate system may be called.

Next, the terminal attempts object recognition from the camera image and if an object is recognized, additionally generates an object recognition-based 3D matched coordinate system. Next, information (contents) is augmented on the object, where, even if a large part of the object is not included in the camera image of the terminal, virtual information may be augmented with respect to the space and object.

To summarize, if the augmented reality system 1 comprises a terminal and the server 200, the server 200 visually identifies a physical object from actual image information and provides a virtual object of a 3D virtual image, which is assigned to each identified physical object, to the terminal, where the terminal recognizes the space in 3D, generates a 3D spatial matched coordinate system, displays a pre-assigned virtual object at the coordinates of each physical object with reference to the 3D spatial matched coordinate system; each time the physical object of actual image information is visually recognized based on object recognition, the coordinates of the physical object are determined again, the coordinates of the determined physical object are updated, and a pre-assigned virtual object is displayed at the updated coordinates of the physical object.

Also, the terminal recognizes the space in 3D, generates a 3D spatial matched coordinate system, displays a pre-assigned virtual object to the coordinates of each physical object with reference to the 3D spatial matched coordinate system, where, each time a physical object of actual image information is visually recognized based on object recognition, the coordinates of the physical object are determined, a 3D matched coordinate system based on object recognition is additionally generated, and the 3D spatial matched coordinate system is updated with reference to the 3D matched coordinate system based on object recognition.

Therefore, the server 200 may determine a virtual object assigned to each physical object through the current position information of the user carrying the terminal and the actual image information captured by the video camera of the augmented reality glasses 100; and transmit the information about the virtual object to the terminal in real-time.

Meanwhile, the augmented reality system 1 with an object tracking-based frame region recording and reproduction technique according to an embodiment of the present invention may capture a manipulation video of a process where a user operates a physical object in an augmented reality manual generation mode; and display a virtual object obtained by converting the manipulation video into an augmented reality by superimposing the virtual object on the physical object in an augmented reality manual execution mode.

In other words, when the augmented reality manual generation mode is set, the augmented reality glasses 100 may capture a manipulation video of a process where a user operates a physical object of actual image information and transmit the captured video to the server 200. And when the augmented reality execution mode is set, the augmented reality glasses 100 may receive a virtual object in a 3D virtual image obtained from conversion of the manipulation video into an augmented reality by the server 200 and display the received virtual object by superimposing the received virtual object on the physical object.

Figure 5A:
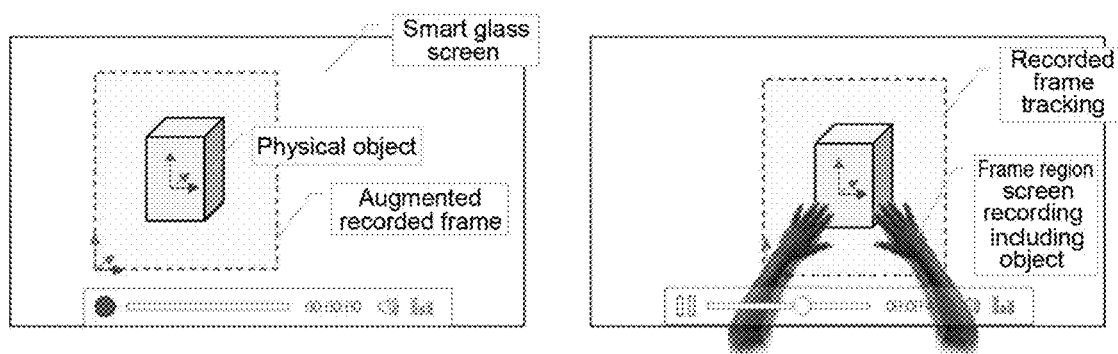
FIGS. 5a and 5b illustrate operation status in an augmented reality manual generation mode of an augmented reality system.

FIG. 5a illustrates operation status in an augmented reality manual generation mode of the augmented reality system 1.

Referring to FIG. 5a, if a user wearing the augmented reality glasses 100 looks at a physical object for which an augmented reality manual is to be developed after the augmented reality manual generation mode is set, the augmented reality glasses 100 may automatically configure a 3D matched coordinate system dedicated to augmented reality for the physical object.

At this time, to create a virtual object, the user may additionally configure a region for which a manipulation video is to be generated. In other words, by selecting a physical object and designating a specific part of the physical object, a manipulation video for the specific region may be recorded.

Therefore, after the user sets the augmented reality manual generation mode, a maintenance work for the physical object designated by the user may be recorded through a camera installed at the augmented reality glasses 100.

It should be noted that if a recording frame shape is changed according to the camera viewpoint, the frame shape may be reconstructed to its original one through 3D object tracking. In other words, the augmented reality glasses 100 may generate a manipulation video that maintains the initial camera viewpoint for a selected physical object even if the camera viewpoint is changed while the manipulation video of a process where the user operates the physical object is being captured.

More particularly, the manipulation video may be a video capturing manipulation motion of a user with respect to the physical object while the camera is fixed to its initial viewpoint looking at a recording region determined by selecting or designating a physical object.

Therefore, even if the viewpoint of the camera of the augmented reality glasses 100 is changed according to the user's motion, the manipulation video may be captured continuously at the camera's initial viewpoint through 3D object tracking. If the capture position is moved more than a predetermined distance or camera viewpoint is changed, the augmented reality glasses 100 may change the capture direction of the camera and continue to capture the recording region at the initial camera viewpoint.

And if the augmented reality glasses 100 fail to obtain a manipulation video for the recording region at the initial camera viewpoint as the viewpoint changed during a first time period deviates by more than a predetermined angle with respect to the initial camera viewpoint, the video captured during the first time period may be removed from the manipulation video. At this time, even if the first time period lasts longer than a preconfigured time period, since the user's manipulation motion may be meaningful at the changed camera viewpoint, the augmented reality glasses 100 include the video captured during the first time period in the manipulation video but exclude the video captured during the first time period from augmentation targets when the manipulation video is converted into an augmented reality and include the video captured during the first time period in a 3D virtual image only in the form of a 2D image. Therefore, while the augmented reality glasses 100 display 3D virtual images, 2D manipulation images not converted to an augmented reality may be displayed during the first time period.

Figure 5B:
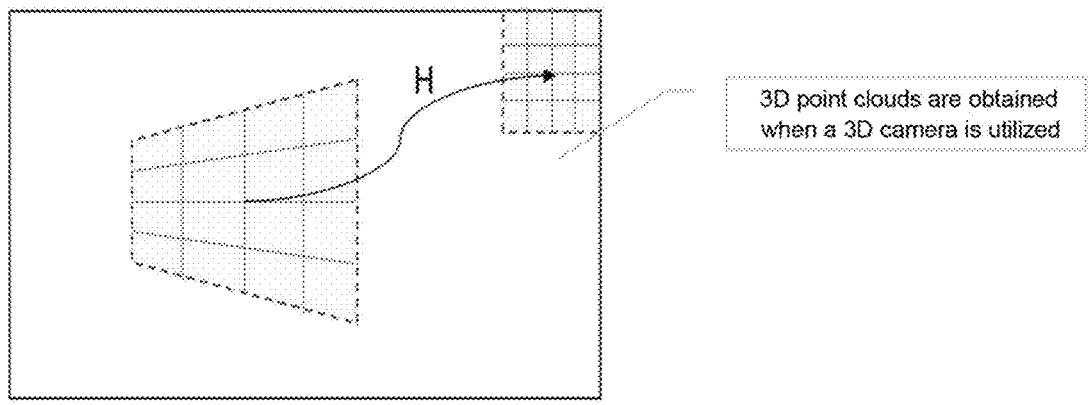

Also, referring to FIG. 5b, the augmented reality glasses 100 may obtain 3D depth information about a physical object captured in a manipulation video for 3D object tracking. Since the augmented reality glasses 100 are equipped with a 3D sensor, 3D images of a physical object may be obtained through the 3D sensor. In other words, the camera of the augmented reality glasses 100 may include a depth camera capable of obtaining a manipulation video not only from a normal RGB signal but also from 3D point clouds. Detailed descriptions of the augmented reality glasses 100 will be described later.

As described above, after the user wears the augmented reality glasses 100, a process for capturing a manipulation video of the user's operating a physical object, storing the captured manipulation video, and uploading the manipulation video to the server 200 is performed.

Here, the manipulation video may include instructions about how to use a physical object (equipment) and maintenance. In other words, a process for simply operating equipment, a trouble shooting procedure, a disassembling and assembling process in case of failure, and so on may be captured and transmitted to the server 200.

Figure 6:
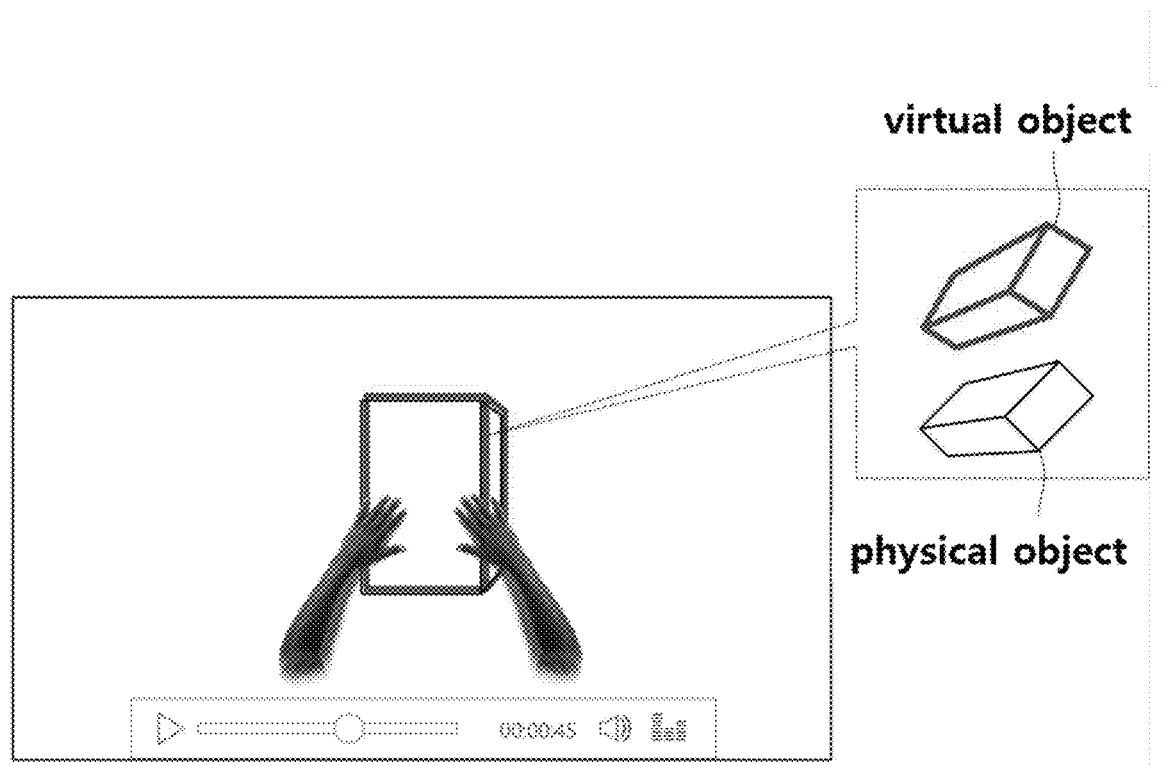
FIG. 6 illustrates operation status in an augmented reality manual execution mode of an augmented reality system.

FIG. 6 illustrates operation status in an augmented reality manual execution mode of the augmented reality system 1.

Referring to FIG. 6, if a user wearing the augmented reality glasses 100 looks at a physical object after the augmented reality manual execution mode is set, the augmented reality glasses 100 may automatically recognize the physical object. In other words, based on the current position information of the augmented reality glasses 100 and actual image information captured by the camera, a 3D virtual image corresponding to the physical object may be displayed on the augmented reality glasses 100.

More specifically, a manipulation video augmented with a 3D virtual image may be displayed on a physical object of the actual image information. To be specific, the server 200 may extract a physical object, which is a manipulation target in the manipulation video, and a manipulation motion of the user who operates the physical object and generate a virtual object augmented on the physical object of the manipulation video.

And the server 200 may assign a predetermined degree of transparency so that a 3D virtual image including the generated virtual object is displayed together with a physical object of actual image information.

By 3D object tracking of a physical object and the manipulation motion while capturing the manipulation video, the server 200 stores a position relationship in the 3D space between a virtual object generated from enhancement to an augmented reality and the physical object, and thereby, even if the camera viewpoint is changed in the manual execution mode, the virtual object may be moved according to the position of the physical object by taking into account the viewpoint change and displayed correctly by being superimposed on the physical object.

In other words, after receiving the 3D virtual image from the server 200, the augmented reality glasses 100 may display a virtual object on a physical object by matching the coordinates of the virtual object of the 3D virtual image and the physical object and superimposing the virtual object on the physical object, where, at this time, a predetermined degree of transparency is assigned to the virtual object of the 3D virtual image so that the user may recognize the physical object beneath the virtual object.

It should be noted that through gaze, voice recognition, hand gesture, and a separate embedded input device (for example, touchpad and joystick) of the augmented reality glasses 100, the user may control recording and reproduction of a 3D virtual image in which a physical object and a virtual object are displayed.

Figure 7:
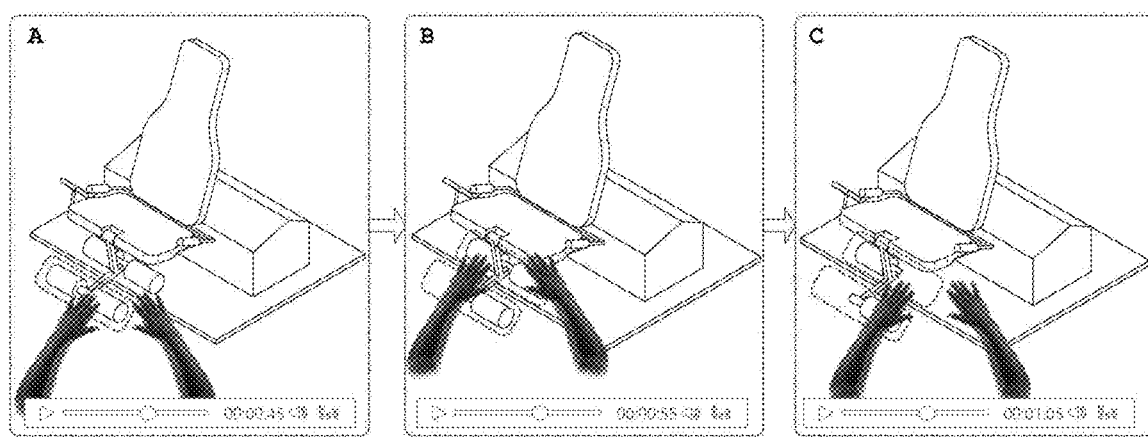
FIG. 7 illustrates other operation status in an augmented reality manual execution mode of an augmented reality system.

FIG. 7 illustrates other operation status in an augmented reality manual execution mode of the augmented reality system 1.

Referring to FIG. 7, a physical object and a matched virtual object corresponding to the physical object may be displayed on the augmented reality glasses 100. In other words, FIG. 7 shows the motion of disassembling a physical object, where a matched virtual object is displayed together.

The server 200 may set a disassembling mode or automatically set the disassembling mode when a disassembling object from a physical object is detected.

And the server 200 may detect the region of a disassembling object disassembled from a physical object, additionally configure a virtual object that highlights the region by using a dotted line, and when the disassembling object is disassembled completely and moved from the physical object by more than a predetermined distance, remove the disassembling object from a virtual image.

If a disassembling operation is detected continuously, the server 200 may form an order for individual disassembling objects and generate virtual images according to the order. More specifically, if a first disassembling object and a second disassembling object are disassembled sequentially and the disassembling operation is completed, the server 200 may assign different highlights to the respective disassembling objects and then display the disassembling objects with different highlights on an initial virtual image so that the disassembling objects may be distinguished by their order. Next, the server 200 may generate a virtual image by converting a first manipulation video showing a disassembling operation of the first disassembling object and a second manipulation video showing a disassembling operation of the second disassembling object sequentially into augmented realities, and then divide the virtual image into a disassembling image of the first disassembling object and a disassembling image of the second disassembling object by checking the completion time of the first manipulation video. The augmented reality glasses 100 may receive the virtual image and display the received virtual image as shown in FIG. 7. To be specific, first, in the case of the first drawing A and the second drawing B, since a first region of a disassembling target is indicated by a dotted line, the user may perform a disassembling operation of the first region in the same way as shown in the virtual image.

Next, in the case of the second drawing B and the third drawing C, since the second region of the disassembling target is indicated by a dotted line, the user may perform a disassembling operation of the second region in the same way as shown in the virtual image.

At this time, depending on embodiments, a virtual image displaying the disassembling procedure may be reproduced continuously in the form of a video irrespective of whether the user actually performs the disassembling operation; and reproduction and repetition speeds may be configured.

When an interactive mode is set in another embodiment, a displayed virtual image may be reproduced while being synchronized to the progress of the physical disassembling operation of the user. In other words, the augmented reality glasses 100 or server 200 may display the virtual image of a first manipulation video by adjusting the reproduction speed according to the disassembling speed until completion of the disassembling operation of the first disassembling object in the first region of the physical object is automatically recognized. Next, if the augmented reality glasses 100 detects completion of the disassembling operation as the first disassembling object is moved by more than a predetermined distance, the second region is indicated by a dotted line, and the augmented reality glasses 100 may display the virtual image of a second manipulation video with respect to the disassembling operation of the second region while adjusting the reproduction speed according to the speed of the disassembling operation. Depending on embodiments, the corresponding virtual image is reproduced repeatedly until the disassembling operation of the first region of the physical object is completed, and when the disassembling time is delayed, the image production speed may be automatically set to be slow.

Meanwhile, the augmented reality system 1 according to an embodiment of the present invention may determine an additional recognition area and identify similar objects by assigning unique identifiers to the respective physical objects based on an image difference of the additional recognition area.

Also, the augmented reality system 1 may identify physical objects by taking into account all of the unique identifiers assigned to the respective physical objects based on the image difference of the additional recognition area and current position information of each physical object.

Therefore, even if physical objects with a high similarity are arranged, the physical objects may be identified, virtual objects assigned to the respective physical objects may be displayed, and thereby unambiguous information may be delivered to the user.

Visual recognition may be divided into four phases: Detection, Classification, Recognition, and Identification (DCRI).

First, detection refers to a phase where only the existence of an object may be known.

Next, classification refers to a phase where the type of the detected object is known; for example, whether a detected object is a human or an animal may be determined.

Next, recognition refers to a phase where overall characteristics of the classified object are figured out; for example, brief information about clothes worn by a human is obtained.

Lastly, identification refers to a phase where detailed properties of the recognized object are figured out; for example, face of a particular person may be distinguished, and the numbers of a car license plate may be known.

The augmented reality system 1 of the present invention implements the identification phase and thereby distinguishes detailed properties of similar physical objects from each other.

For example, the augmented reality system 1 may recognize characters attached to particular equipment (physical object) having a similar shape and assign a unique identification number thereto or identify a part of the physical object exhibiting a difference from the others, determine the identified part as an additional recognition region, and by using all of the differences of 2D/3D characteristic information of the additional recognition region, satellite position information, and current position information measured through a Wi-Fi signal, distinguish the respective physical objects having high similarities from each other.

Figure 8A:
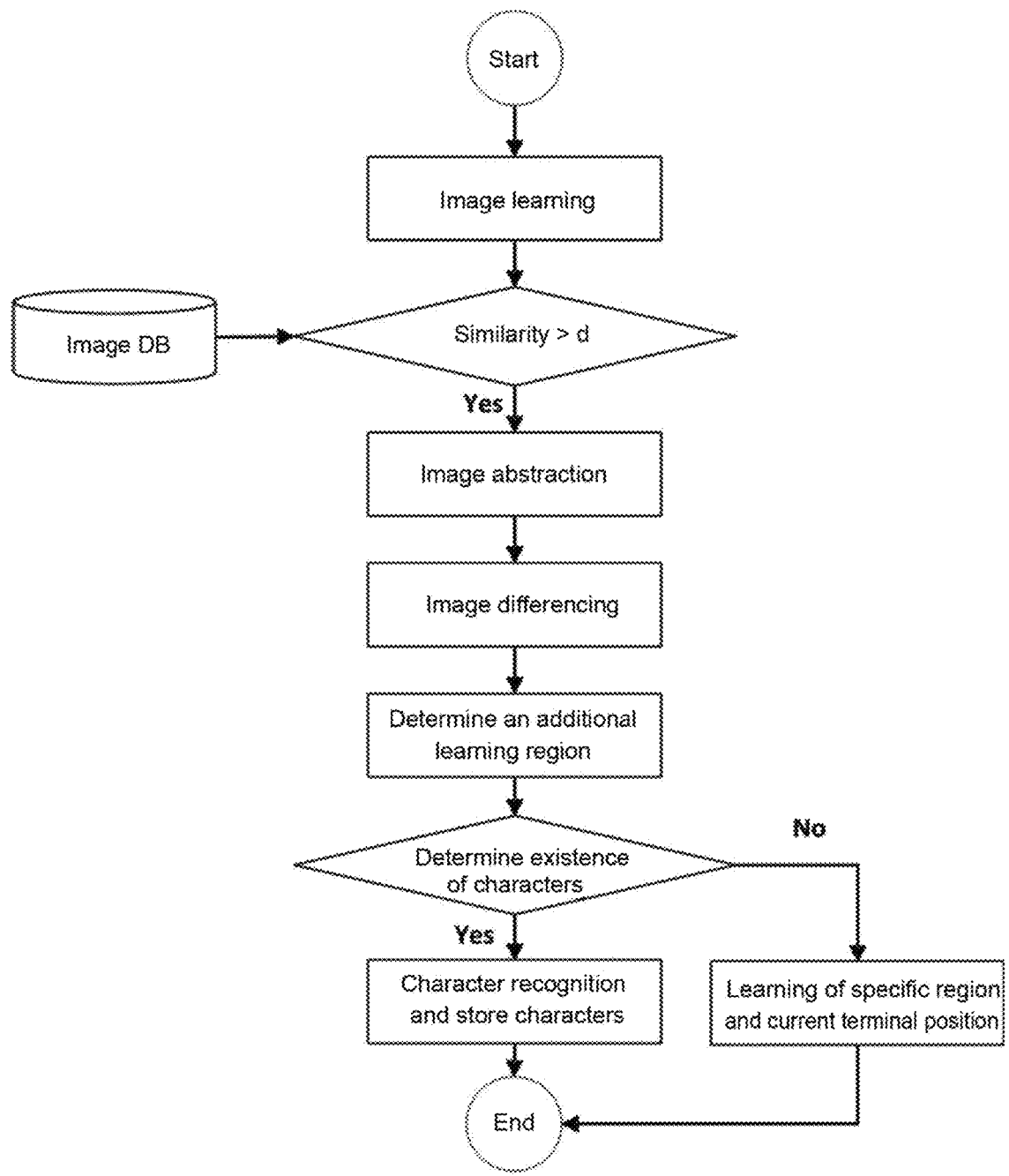
FIG. 8a is a flow diagram illustrating a learning process for identifying similar objects in an augmented reality system.
Figure 8B:
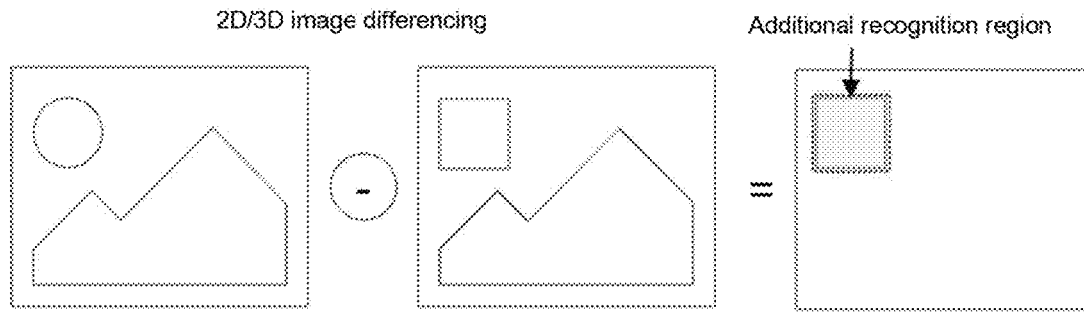
FIG. 8b illustrates a process for determining an additional recognition area for identifying similar objects in the augmented reality system.

FIG. 8*a* is a flow diagram illustrating a learning process for identifying similar objects in the augmented reality system 1, and FIG. 8*b* illustrates a process for determining an additional recognition area for identifying similar objects in the augmented reality system 1.

Referring to FIGS. 8*a* and 8*b*, the server 200 operates to identify a physical object of actual image information and provide the augmented reality glasses 100 with a virtual object of a 3D virtual image assigned to the identified physical object.

In other words, among a plurality of physical objects present in the actual image information, the server 200 determines additional recognition regions by subtracting the physical objects showing a predetermined degree of similarity d from the corresponding actual image information and assigns unique identifiers to the respective physical objects based on the visual differences of the additional recognition regions.

For example, if additional recognition regions contain different characters or numbers, the server 200 may assign unique identifiers to the respective physical objects based on the differences among the additional recognition regions, store the assigned unique identifiers in the form of a database, and transmit virtual objects assigned to the respective unique identifiers to the augmented reality glasses 100.

In other words, if a plurality of physical objects have a visual similarity larger than a predetermined value d, the image is abstracted and subtracted to determine additional recognition regions (additional learning regions), and then unique identifiers are assigned to the respective physical objects by identifying the differences of the additional recognition regions.

Figure 9:
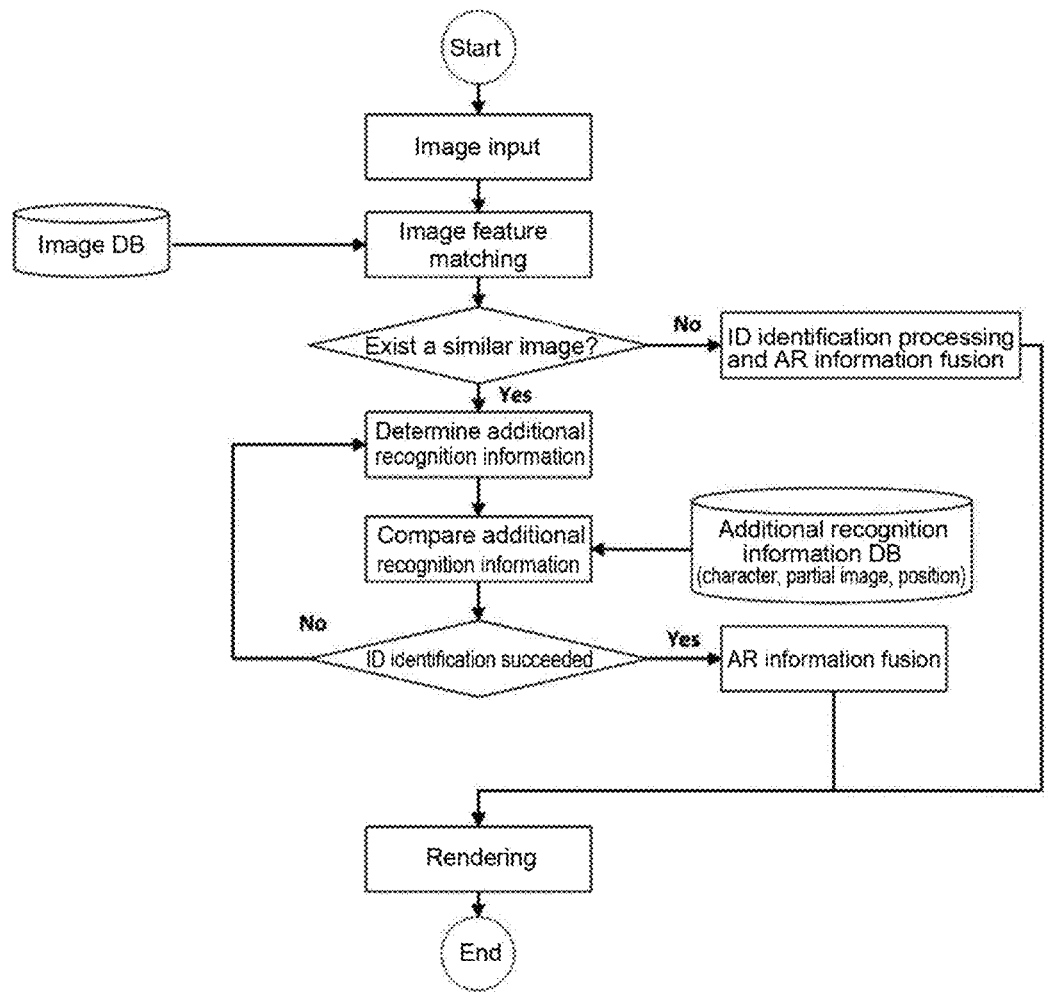
FIG. 9 is a flow diagram illustrating a process for identifying similar objects in an augmented reality system.
Figure 10:
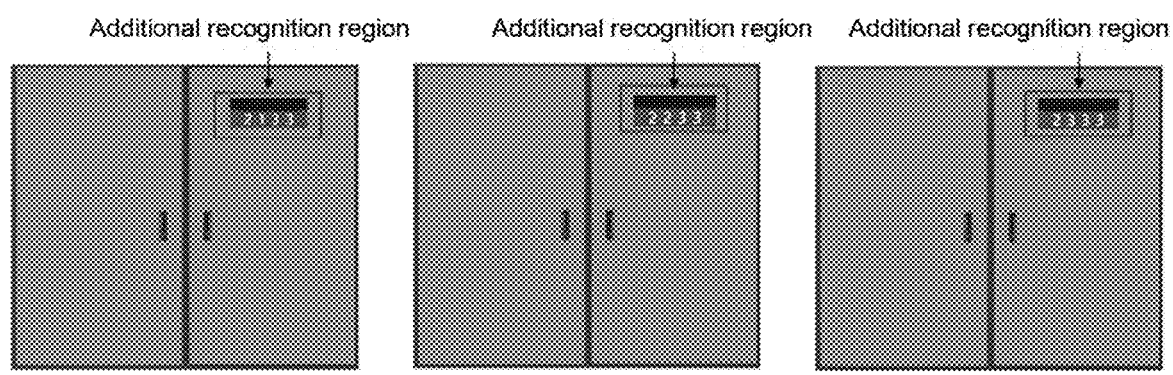
FIG. 10 is a first example illustrating a state for identifying similar objects in an augmented reality system.

FIG. 9 is a flow diagram illustrating a process for identifying similar objects in the augmented reality system 1, and FIG. 10 is a first example illustrating a state for identifying similar objects in the augmented reality system 1.

Referring to FIGS. 9 and 10, if actual image information is received from the augmented reality glasses 100, the server 200 distinguishes a physical object of the actual image information, and if similar images are not found (if physical objects having a similar shape are not found), a virtual object corresponding to the identified image is assigned.

At this time, in the presence of similar objects (in the presence of physical objects with a similar shape), the server 200 compares the information of the additional recognition regions and identifies unique identifiers and then allocates a virtual object corresponding to each unique identifier.

In other words, as shown in FIG. 10, if particular equipment (physical object) having a similar shape is disposed in the vicinity, the server 200 may recognize a plurality of physical objects from actual image information transmitted from the augmented reality glasses 100, identify unique identifiers by comparing information of additional recognition regions of the respective physical objects, and assign a virtual object corresponding to each unique identifier identified from the corresponding additional recognition region.

Meanwhile, when a different identifying marker is printed on the additional recognition region of each equipment, the shape of the identifying marker may be composed as follows.

An identifying marker may be composed of a first identifying marker region, second identifying marker region, third identifying marker region, and fourth identifying marker region.

In other words, the first, second, third, and fourth identifying markers are recognized as one identifier. In other words, by default, the augmented reality glasses 100 captures all of the first to the fourth identifying markers and transmits the captured identifying markers to the server 200; and then the server 200 regards the recognized identifying markers as a single unique identifier.

At this time, the first identifying marker is constructed to reflect visible light. In other words, the first identifying marker region is printed with a normal paint so that a human may visually recognize the marker.

Also, the second identifying marker reflects light in a first infrared region, which is printed with a paint that reflects light in the first infrared region and is not recognizable by a human.

Also, the third identifying marker reflects light in a second infrared region, in which wavelength of light is longer than that of the light in the first infrared region. The third identifying marker is printed with a paint that reflects light in the second infrared region and is not recognizable by a human.

Also, the fourth identifying marker reflects light in the first and second infrared regions simultaneously, which is printed with a paint that reflects light in both of the first and second infrared regions and is not recognizable by a human.

At this time, the camera of the augmented reality glasses 100 that captures the identifying markers is equipped with a spectral filter that adjusts infrared transmission wavelength and is configured to recognize the identifying markers by capturing the infrared wavelength region.

Therefore, among the identifying markers printed on the equipment, only the first identifying marker may be checked visually by a human while the second, third, and fourth identifying marker regions may not be visually checked by the human but may be captured only through the camera of the augmented reality glasses 100.

The relative print positions (left, right, up, and down) of the first, second, third, and fourth identifying markers may be used as identifiers. In the identifying marker region, various characters such as numbers, symbols, or codes may be printed. Also, identifying markers may also be printed in the form of an QR code or barcode.

Figure 11:
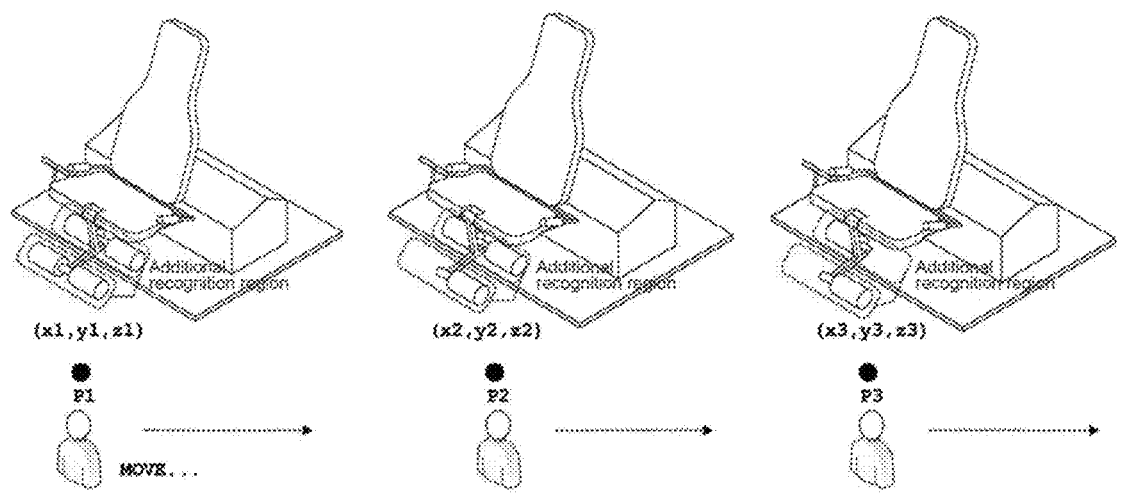
FIG. 11 is a second example illustrating a state for identifying similar objects in an augmented reality system.

FIG. 11 is a second example illustrating a state for identifying similar objects in the augmented reality system 1.

Referring to FIG. 11, the server 200 may identify each physical object by considering all of the unique identifier assigned to the physical object based on an image difference of the corresponding additional recognition region and current position information of the physical object. In other words, a physical object may be identified by additionally considering the current position information of the user (augmented reality glasses 100).

For example, if a plurality of physical objects maintain a predetermined separation distance from each other, even a physical object showing a high similarity may be recognized by using the current position information of the user. Here, it is assumed that the current position information includes all of the absolute position information, relative position information, travel direction, acceleration, and gaze direction of the user.

At this time, to further identify physical objects not identifiable from current position information, the server 200 may determine an additional recognition region and distinguish the differences among physical objects by recognizing the additional recognition region.

Also, the server 200 may determine a candidate position of the additional recognition region based on the current position information of each physical object.

In other words, referring to FIG. 11, if the user is located at the first position P1 and looks at a physical object in the front, the server 200 determines a separation distance between the corresponding physical object and the user based on actual image information and detects the 3D coordinates (x1, y1, z1) of the physical object.

Since a plurality of additional recognition regions are already assigned to the physical object located at the 3D position (x1, y1, z1), the server 200 may determine a candidate position of the additional recognition region based on the 3D coordinates (x1, y1, z1) of the physical object, namely based on the current position information of the physical object.

Since the server 200 already knows which physical object already exists at the 3D coordinates (x1, y1, z1) and which part of the physical object has been designated as the additional recognition region, the server 200 may identify an object simply by identifying the candidate position of the additional recognition region. This method provides an advantage that the amount of computations may be reduced for identifying additional recognition regions.

It should be noted that if an indoor environment is assumed and lighting directions are all the same, even physical objects with a considerable similarity may have shadows with different positions and sizes due to the lighting. Therefore, the server 200 may identify the individual physical objects by using the differences among positions and sizes of shadows of the respective physical objects as additional information with reference to the current position of the user.

To summarize, the server 200 may perform image identification for the objects within an image through a first DCRI neural network that may handle a small amount of data processing and thereby detect a plurality of physical objects having a predetermined degree of image similarity.

If identification of a plurality of similar objects is not possible, an additional recognition region may be detected from each of a plurality of physical objects through the first DCRI neural network. Here, the additional recognition region refers to the region including at least one of characters, numbers, identifying marker, QR code, barcode, and symbol.

Next, the server 200 may identify the symbol of the additional recognition region by performing image identification for the additional recognition region through a second DCRI neural network that provides a relatively high data processing throughput. And the server 200 may designate a difference of symbols in the additional recognition region for each of a plurality of physical objects as a unique identifier.

At this time, the server 200 may detect the coordinates of a physical object from the 3D spatial matched coordinate system, assign a relative position to the additional recognition region in the physical object, and then match coordinates of the physical object, relative position of the additional recognition region, and unique identifier to a virtual object assigned to the physical object and store the matching result in a database.

Afterwards, if actual image information and current position information are transmitted from the augmented reality glasses 100, the image of the additional recognition region may be detected from the actual image information through the coordinates of the physical object from the database and relative position of the additional recognition region.

And the server 200 may detect a unique identifier by identifying the image of the additional recognition region right through the second DCRI neural network, detect a virtual object matched to the unique identifier, and thereby detect a correct virtual object with respect to the physical object and transmit the detected virtual object to the augmented reality glasses 100.

Also, if an additional identifying marker is added to the unique identifier, the server 200 may update a virtual object matched to the unique identifier and transmit the updated virtual object to the augmented reality glasses 100. More specifically, by adding at least one of the first to the fourth identifying markers to the symbol of the additional recognition area, the user may modify the virtual object analogously with respect to the similar physical object. To this purpose, the server 200 may store a virtual object modification process for each identifying marker and if an identifying marker is additionally displayed in the vicinity of the unique identifier, may update the virtual object matched to the physical object according to the virtual object modification process matched to the identifying marker. Through this method, an advantage is obtained that the user may modify a virtual object by directly modifying a physical object intuitively without involving a separate interface or programming. Also, by using various identifying markers that may be recognized only through infrared imaging, an identifying marker may be made not to influence the external appearance of the physical object.

Meanwhile, the position of a virtual object of a 3D virtual image assigned to the corresponding physical object of actual image information is automatically adjusted so that a separation distance from the physical object is maintained and so displayed on the augmented reality glasses 100.

Also, positions of individual virtual objects are automatically adjusted so that a predetermined separation distance is maintained among the virtual objects and so displayed on the augmented reality glasses 100.

Therefore, since positions of objects are automatically adjusted by taking into account a relative position relationship between a physical and virtual objects so that the objects are not overlapped with each other, the user may check the information of a desired virtual object conveniently. In other words, a time period during which a user concentrates on the corresponding virtual object is lengthened, and thereby an advertisement effect may be increased.

Figure 12:
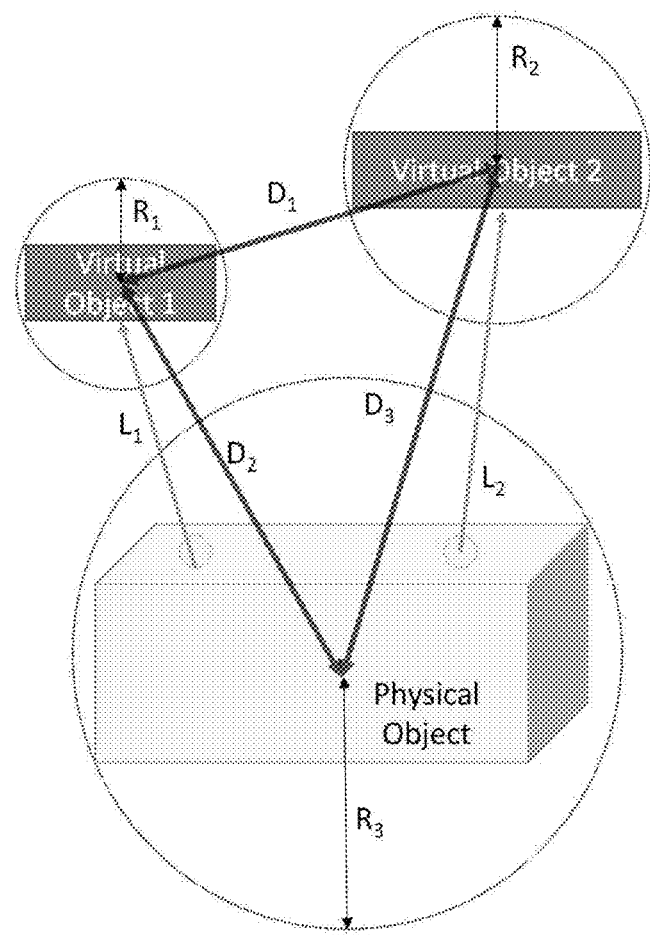
FIG. 12 illustrates another operating principle of the augmented reality system.

FIG. 12 illustrates another operating principle of the augmented reality system 1.

Referring to FIG. 12, the operating principles of the augmented reality system 1 will be described in more detail.

The separation distance D2 between a first virtual object (virtual object 1) and a physical object is automatically configured to be longer than a sum of the distance R1 between the center of the first virtual object (virtual object 1) and the outermost region of the first virtual object (virtual object 1) and the distance R3 between the center of the physical object and the outermost region of the physical object.

Also, the separation distance D3 between a second virtual object (virtual object 2) and a physical object is automatically configured to be longer than a sum of the distance R2 between the center of the second virtual object (virtual object 2) and the outermost region of the second virtual object (virtual object 2) and the distance R3 between the center of the physical object and the outermost region of the physical object.

Also, the separation distance D1 between the first virtual object (virtual object 1) and the second virtual object (virtual object 2) is automatically configured to be longer than a sum of the distance R1 between the center of the first virtual object (virtual object 1) and the outermost region of the first virtual object (virtual object 1) and the distance R2 between the center of the second virtual object (virtual object 2) and the outermost region of the second virtual object (virtual object 2).

The first virtual object (virtual object 1) and the second virtual object (virtual object 2) move in the horizontal and vertical directions and their positions in 3D space are automatically adjusted—with respect to the x, y, and z axis—so as to prevent the first and second virtual objects from being overlapped with other objects and disappearing from the field of view of the user.

Meanwhile, virtual lines L1, L2 are dynamically generated and displayed between the physical object and the first virtual object (virtual object 1) and between the physical object and the second virtual object (virtual object 2).

Virtual lines L1, L2 are displayed to indicate association with the physical object when a large number of virtual objects are present on the screen; and thickness, transparency, and color of the virtual lines L1, L2 may be changed automatically according to the gaze of the user.

For example, if the user gazes at the first virtual object (virtual object 1) longer than a predetermined time period, the augmented reality glasses 100 may operate to detect whether the first virtual object (virtual object 1) is gazed at and then to automatically change the thickness of the virtual line L1 between the physical object and the virtual object 1 (virtual object 1) to be thicker than that of the other virtual line L2, change the transparency to be lower, and change the color to another color that may be used to emphasize the virtual line, such as red color.

At this time, if it is assumed that both of the first virtual object (virtual object 1) and the second virtual object (virtual object 2) are allocated to the same physical object, the distance of a plurality of virtual objects assigned to the physical object is kept to a predetermined separation distance D2, D3, but the virtual object that has more specific information is disposed to be relatively closer to the physical object.

For example, suppose the information of the first virtual object (virtual object 1) is more specific, and the information of the second virtual object (virtual object 2) is relatively conceptual information.

Then the separation distance D3 between the second virtual object (virtual object 2) and the physical object is automatically set to be longer than the distance D2 between the first virtual object (virtual object 1) and the physical object, and thereby the user may quickly recognize the specific information.

Also, if a plurality of virtual objects are assigned to the physical object, two virtual objects may be automatically disposed to be closer as association with each other becomes high while the two virtual objects may be automatically disposed to be distant from each other as association with each other becomes low.

Figure 13A:
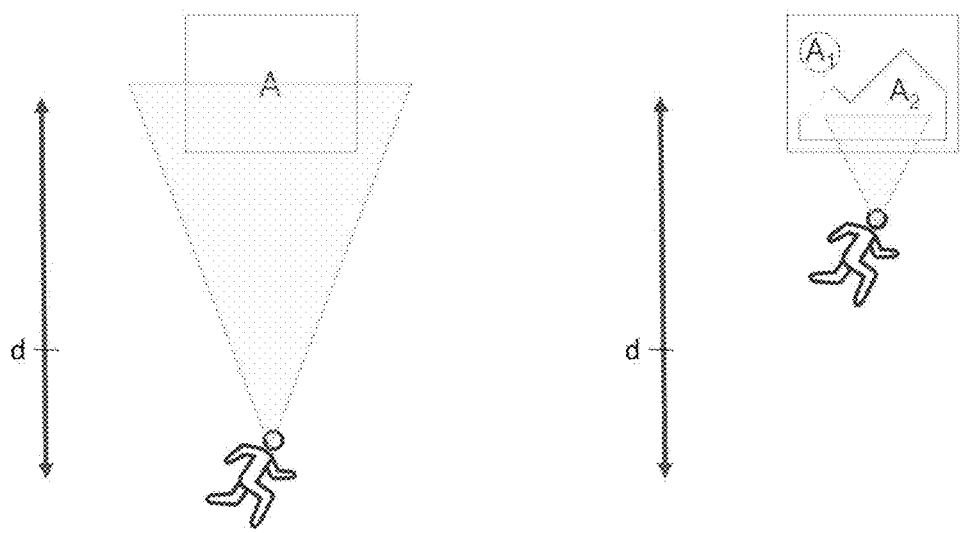
FIGS. 13a and 13b illustrate yet another operating principle of the augmented reality system.
Figure 13B:
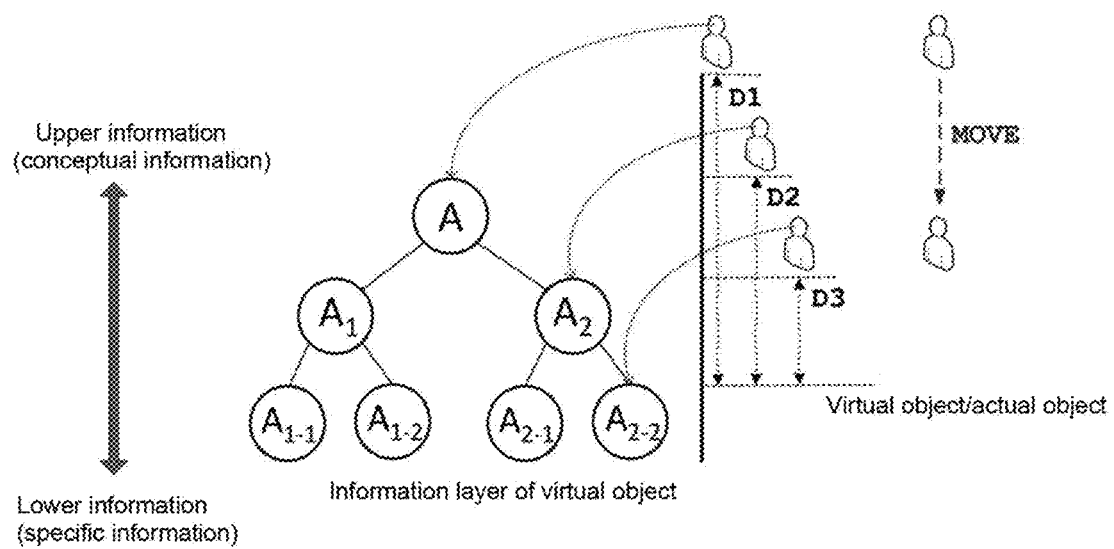

FIGS. 13a and 13b illustrate yet another operating principle of the augmented reality system 1.

Referring to FIGS. 13a and 13b, the amount of information of a virtual object in a 3D virtual image, displayed by being assigned to the corresponding physical object of actual image information may be automatically adjusted dynamically according to the distance between the physical object and the user and displayed on the augmented reality glasses 100.

Therefore, since the virtual object displays more specific information when the user approaches the physical object, the user may check information of a desired virtual object conveniently. In other words, a time period during which the user concentrates on the corresponding virtual object is lengthened, and thereby an advertisement effect may be increased.

In general, since a user tends to see information about an object of interest more closely, when the user is distant from the object of interest, information is displayed in an abstract manner while, when the user approaches an object of interest, more detailed information is made to be displayed.

A virtual object assigned to a physical object begins to be displayed from since the distance between the user and the physical object or virtual object reaches a predetermined separation distance D1; as the distance between the user and the physical object or virtual object becomes short, a virtual object having more specific information is displayed.

In other words, the information of a virtual object assigned to one physical object is organized in a layered structure. As shown in FIG. 13b, the most abstract virtual object A is displayed when the user enters a predetermined separation distance D1; when the user approaches D2 further toward the physical object or virtual object, a virtual object A1, A2 having more specific information is displayed. Also, if the user approaches D3 most closely toward the physical object or virtual object, a virtual object A1-1, A1-2, A2-1, A2-2 having the most specific information is displayed.

For example, suppose an automatic vending machine is disposed in front of the user as a physical object.

If the user approaches within a predetermined separation distance D1, a virtual object assigned to the automatic vending machine is displayed. Here, a virtual object is assumed to be expressed by an icon of the automatic vending machine.

Next, if the user further approaches D2 the automatic vending machine, icons of beverage products sold at the automatic vending machine are displayed as virtual objects with more specific information.

Lastly, if the user approaches D3 most closely to the automatic vending machine, calories, ingredients, and so on of the beverage products may be displayed as virtual objects with more specific information.

In another example, suppose a car dealership exists as a physical object in front of the user.

If the user approaches within a predetermined separation distance D1, a virtual object assigned to the car dealership is displayed. Here, the virtual object is assumed to be the icon of a car company.

Next, if the user further approaches D2 the car dealership, various types of car icons may be displayed as virtual objects providing more specific information. At this time, if a car is currently displayed, namely, in the presence of a physical object, a virtual object may be displayed in the vicinity of the physical object, and a virtual object may also be displayed in the vicinity of the user even if no car is currently displayed, namely, even in the absence of a physical object.

Finally, if the user approaches D3 the car dealership most closely, technical specifications, price, and estimated delivery date of a car being sold may be displayed as virtual objects of more specific information.

Meanwhile, if vibration occurs while the user is gazing at a virtual or physical object of interest, the augmented reality glasses 100 may calculate a movement distance according to the change rate of the vibration, reconfigure the amount of information of the virtual object based on the gaze direction and calculated movement distance, and displays the virtual object with the reconfigured information.

In other words, it may be assumed from vibration that the user has effectively moved without a physical movement, or a weight may be assigned to the movement distance through vibration, or the amount of information of a virtual object may be displayed after being reconfigured according to the virtual movement distance.

In other words, a large change rate of vibration indicates that the user is running or moving fast while a small change range of vibration indicates that the user is moving slowly;

therefore, the movement distance may be calculated based on the change rate of vibration. Therefore, the user may apply vibration by moving his or her head up and down without actually moving around so as to reflect a virtual movement distance.

When vibration is continuously generated simultaneously while the user is gazing in the direction along which the user wants to check status, for example, while the user turns his head and gazes to the right, the augmented reality glasses 100 calculate the movement direction and movement distance based on the gaze direction of the user and the vibration. In other words, if the augmented reality glasses 100 detect vibration from moving of the user's head while the user is gazing at a virtual object to be checked and the current position information of the user is not changed, the augmented reality glasses 100 may start reconfiguring the amount of information for the virtual object due to a virtual movement.

In other words, the augmented reality glasses 100 detect rotation of the user's head through an embedded sensor and calculate the virtual current position after vibration is detected, where the movement distance due to walking or running is figured out through the change rate of the vibration.

When the user's gaze direction is detected, the augmented reality glasses 100 may be configured to detect the gaze direction based on the rotational direction of the head or configured to detect the gaze direction by detecting the movement direction of the eyes of the user.

Also, the gaze direction may be calculated more accurately by detecting the rotational direction of the head and the movement direction of the eyes simultaneously but assigning different weights to the two detection results. In other words, the gaze direction may be configured to be calculated by assigning a weight of 50% to 100% to the rotation angle detection due to rotation of the head and assigning a weight of 0% to 60% to the rotation angle detection due to the movement direction of the eyes.

Also, the user may configure the augmented reality glasses 100 to select and perform a movement distance extension configuration mode so that a distance weight 2 to 100 times the calculated virtual moved distance may be applied.

Also, in calculating a virtual movement distance corresponding to the change rate of vibration, to exclude a noise value, the augmented reality glasses 100 may calculate a virtual movement distance based on the change rate of the vibration value except for the upper 10% and the lower 20% of the vibration magnitude.

Also, when a virtual movement distance is to be changed in accordance with the change rate of vibration due to movement of the head, the augmented reality glasses 100 may adjust the amount of information of a virtual reality object by assigning a weight larger than that for the movement distance of the change rate of vibration due to a physical movement. More specifically, if change rate of vibration is detected while a positional change is fixed, a weight is applied to the change rate of vibration, and the virtual movement distance is calculated to be larger than the movement distance of other vibration change rate due to a physical movement. By doing so, the user may adjust the amount of information of a virtual object by using a minimum amount of head motion, the user convenience may be improved.

Also, if the user gazes a different virtual object while the amount of information of a gazed virtual object is configured, the augmented reality glasses 100 may display the different virtual object with the amount of information for a virtual object reconfigured according to the virtual movement distance. For example, if the user gazes at a different virtual object while specific information of a gazed virtual object is displayed, the augmented reality glasses 100 may again display additional specific information about the virtual object.

Also, as the user moves his or her head in the opposite direction of the direction of a head movement due to a virtual movement, the augmented reality glasses 100 may move the virtual movement distance in the negative direction and thereby reduce the amount of information for the virtual object. Also, the augmented reality glasses 100 may change the viewpoint at which the user gazes the virtual object along the direction that the user moves the head, namely, along the direction that a change rate of vibration is occurred. In other words, as the user moves his or her head, the virtual object may be virtually rotated, which changes the appearance of the virtual object as seen from the front to the one as seen from the side.

As a result, even if the user does not actually approach a physical or virtual object or the user approaches the object very slightly, the user may still check the virtual object with the same amount of information as when the user approaches the physical or virtual object right in front thereof.

Figure 14A:
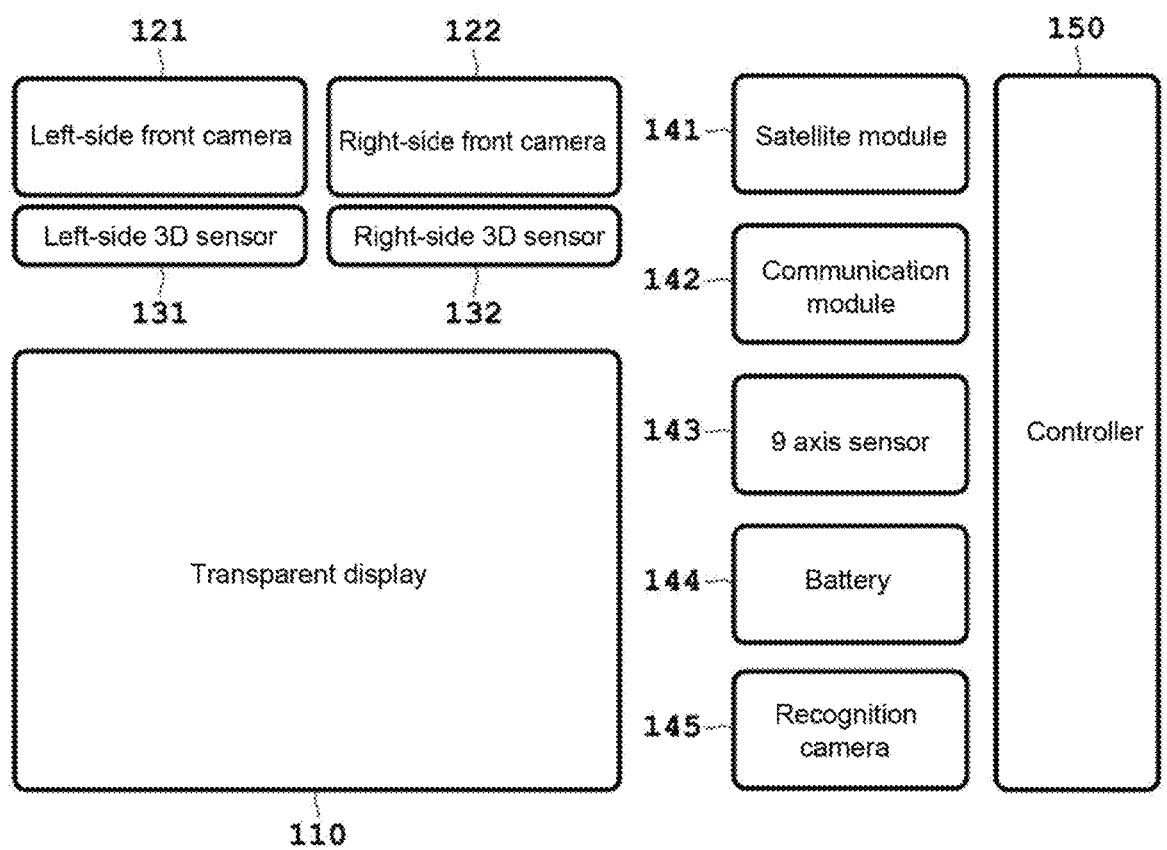
FIG. 14a illustrates a structure of augmented reality glasses of an augmented reality system.
Figure 14B:
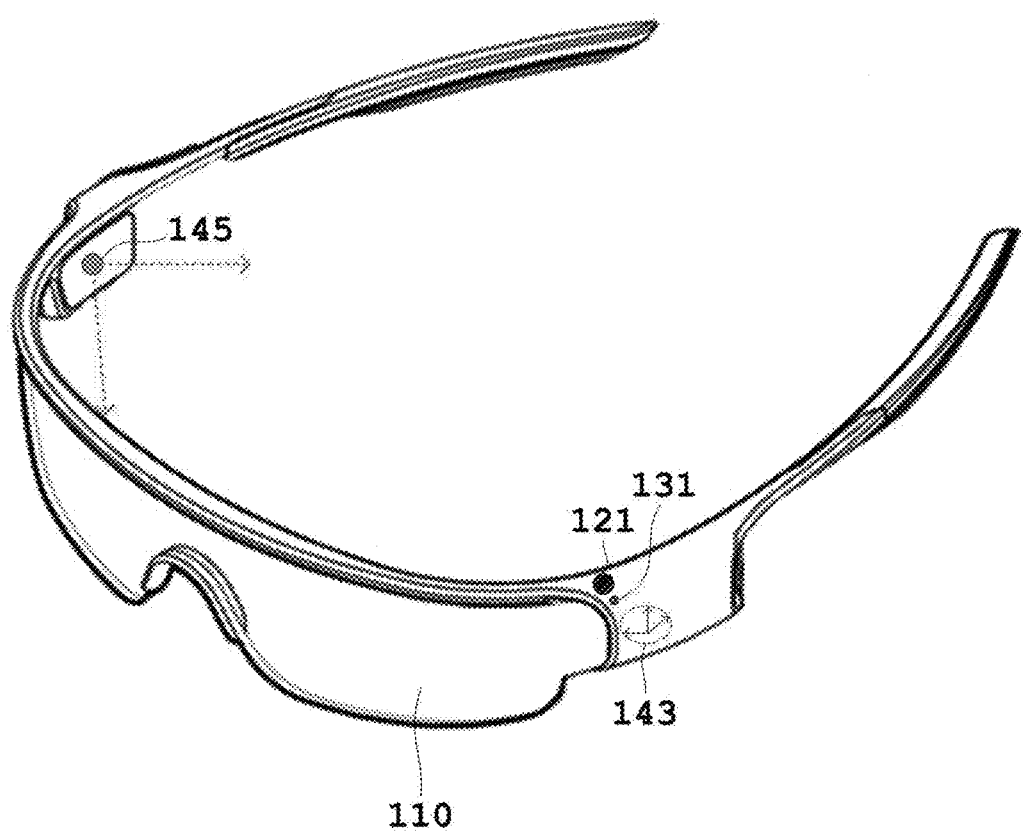
FIG. 14b illustrates augmented reality glasses.

FIG. 14a illustrates a structure of augmented reality glasses 100 of the augmented reality system 1, and FIG. 14b illustrates augmented reality glasses 100.

Referring to FIGS. 14a and 14b, the augmented reality glasses 100 comprise a transparent display 110, left-side front camera 121, right-side front camera 122, left-side 3D sensor 131, right-side 3D sensor 132, satellite module 141, communication module 142, 9 axis sensor 143, battery 144, recognition camera 145, and controller 150.

The transparent display 110 is a display made of a transparent material and forms the lens of the augmented reality glasses 100. Therefore, while looking at the front area, the user may check a physical and virtual objects simultaneously. At this time, the transparent display 110 may be installed over the whole or part of the lens.

The left-side front camera 121 is installed at the left-side of the glasses and obtains actual image information at the front. Also, the right-side front camera 122 is installed at the right-side of the glasses and obtains actual image information at the front.

The left-side 3D sensor 131 and the right-side 3D sensor 132 operates so as to capture 3D images of the front in conjunction with the left-side camera 121 and the right-side camera 122. In other words, the captured 3D images may be stored in an internal memory or transmitted to the server 300. It should be noted that depending on embodiments, only one front camera and only one 3D sensor may be disposed to obtain actual video information. It is preferable that the front camera is configured to capture images from both of the infrared and visible regions.

The satellite module 141 may be included to obtain satellite position information, and the communication module 142 may be equipped with a Wi-Fi communication module, Bluetooth communication module, or Broadband (3G, 4G, LTE) communication module.

The 9 axis sensor 143 is so called because measurement is performed along a total of 9 axes comprising 3 axis acceleration outputs, 3 axis inertial outputs, and 3 axis geomagnetic outputs, where temperature sensors may be added for temperature compensation. The 9 axis sensor 143 may detect the forward-looking direction, movement direction, and inclination of the user by sensing 3D motion of the augmented reality glasses 100.

The battery 144 may be configured to supply operation power to the augmented reality glasses 100, which may be composed of rechargeable Li-ion battery or pseudo capacitor.

It should be noted that the battery 144 may be composed of a plurality of pseudo capacitors, where pseudo capacitors provide an advantage over conventional capacitors because they use a two-dimensional oxidation-reduction reaction at the electrodes and thereby have a relatively long battery life.

The recognition camera 145 detects eye motion of the user, looking direction of the eyes, and size change of the eyes. It is most preferable that the recognition cameras 145 are disposed at the left and right-side respectively, but they may be disposed only at one side.

By default, the recognition camera 145 captures a scene in the direction along which the user's eyes are located but may be configured to capture the image of the user's eyes reflected from the transparent display 110 and detect the eye motion, looking direction of the eyes, and size change of the eyes.

The controller 150 controls the operation of the transparent display 110, left-side front camera 121, right-side front camera 122, left-side 3D sensor 131, right-side 3D sensor 132, satellite module 141, communication module 142, 9 axis sensor 143, battery 144, and recognition camera 145.

Meanwhile, the controller 150 may be configured to charge at least one of a plurality of pseudo capacitors selectively according to the magnitude of charging power. The charging method will be described in detail as follows.

Suppose three pseudo capacitors are disposed, namely first pseudo capacitor, second pseudo capacitor, and third pseudo capacitor. At this time, it is assumed that charging capacity of the first pseudo capacitor is the largest, charging capacity of the second pseudo capacitor is smaller than that of the first pseudo capacitor, and charging capacity of the third pseudo capacitor is even smaller than that of the second pseudo capacitor.

Detecting charged amounts of the first, second, and third pseudo capacitors, the controller 150 supplies operation power in a descending order of charged amount.

For example, suppose the charged amount of the first pseudo capacitor is 60%, that of the second pseudo capacitor is 70%, and that of the third pseudo capacitor is 80%.

Then the controller 150 first supplies power to the third pseudo capacitor. If the charged amount reaches 40%, the controller 150 stops supplying power to the third pseudo capacitor and supplies power to the second pseudo capacitor. Similarly, if the charged amount of the second pseudo capacitor reaches 40%, the controller 150 stops supplying power to the second pseudo capacitor and supplies power to the first pseudo capacitor.

Also, when the charged amounts of the first to the third pseudo capacitors are all less than 40%, the controller 150 supplies operation power by connecting the first to the third pseudo capacitors in parallel.

Figure 15:
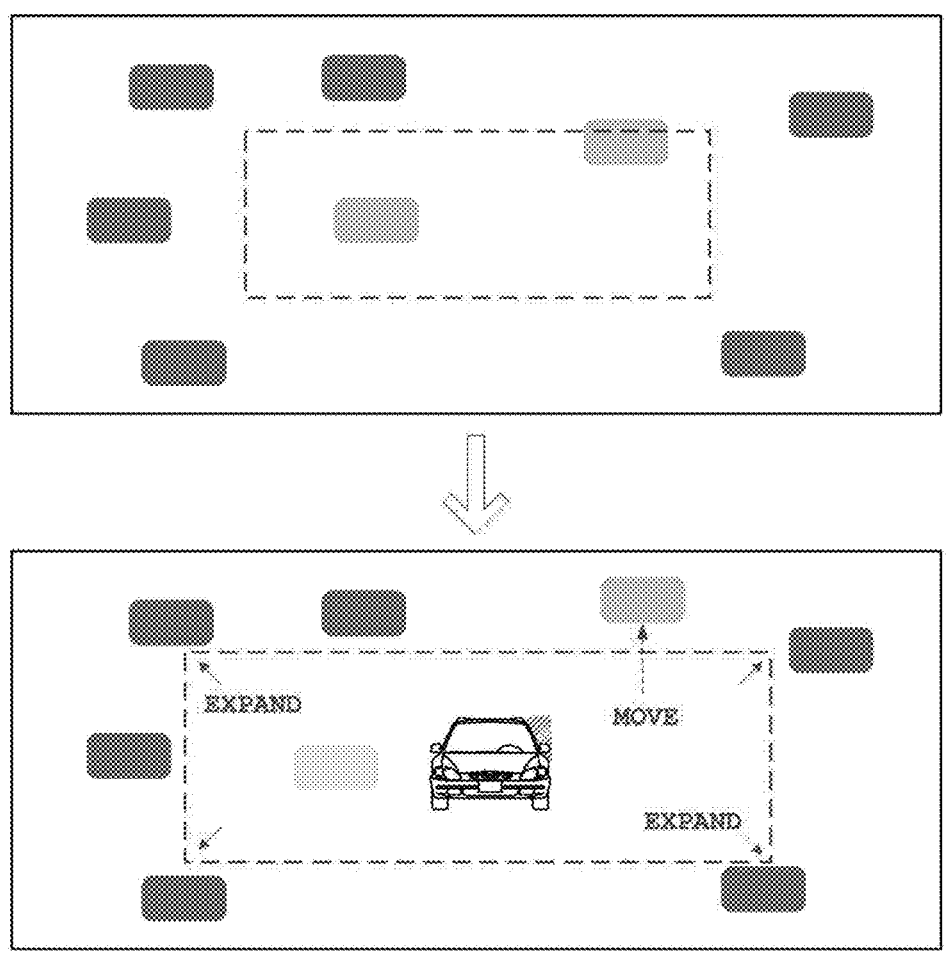
FIG. 15 illustrates a safety mode of an augmented reality system.

FIG. 15 illustrates a safety mode of the augmented reality glasses 1.

The augmented reality system 1 may be set to the safety mode for the safety of a user.

When the safety mode is set, the augmented reality glasses 100 detect a physical object that approaches the user through the front cameras 121, 123. In other words, the augmented reality glasses 100 may detect a physical object approaching fast toward the user, such as a car or a bicycle that may be harmful to the user and display the emergency situation on the transparent display 110.

Referring to FIG. 15, a screen shows that the user is looking at the front area, where a rectangular area indicated by a dotted line in the middle of the screen is defined as a highly attentive area. At this time, the front cameras 121, 122 may detect a physical object approaching fast (with a speed faster than a predetermined value) toward the user, such as a car or a bicycle that may be harmful to the user. Then the size of the highly attentive area is expanded automatically, and a virtual object displayed on the screen is automatically moved to the outward direction or transparency of the virtual object is further reinforced so that the user may easily recognize the fast approaching physical object.

In proportion to (in direct proportion to or in square proportion to) the speed of a physical object approaching the user, the size of the highly attentive area, transparency of the virtual object, and movement speed of the virtual object moving to the outward direction may be automatically determined.

Also, when the recognition camera 145 detects the looking direction of the eyes of the user, the highly attentive area is automatically moved according to the direction of the eyes. In other words, if the eyes of the user gaze to the right, the highly attentive area is moved to the right. At this time, if the front cameras 121, 123 detect that a physical object approaching—from the front—toward the user, such as a car or a bicycle that may be harmful to the user, a safety operation as described above is performed over the highly attentive area, but the highly attentive area is automatically moved to the front of the user.

In other words, the highly attentive area may be configured to be automatically moved toward a physical object approaching fast toward the user.

Also, a new virtual object may be assigned to a physical object that may be harmful to the user, and a virtual line for indicating association of the virtual object with the physical object. At this time, a new virtual object may be displayed in the form of an icon or a character that indicates danger, where an approach speed may also be additionally displayed as a virtual object.

It should be noted that since the recognition camera 145 is capable of detecting movement of the eyes of the user, gazing direction of the eyes, and size change of the eyes, an operation command may be instructed based on the size change of the eyes.

For example, virtual information corresponding to lower level information is gradually displayed each time the user opens his or her eyes wide for a predetermined time period while virtual information corresponding to upper level information is gradually displayed each time the user narrows his or her eyes for a predetermined time period. Also, to improve a command recognition rate of the recognition camera 145, artificial eyebrows for instructions may be attached to the eyebrows of the user. The artificial eyebrows for instructions may be coated with reflective paint that reflects infrared light in a predetermined range, and the recognition camera 145 may be configured to recognize the infrared light, thereby improving the command recognition rate.

Figure 16:
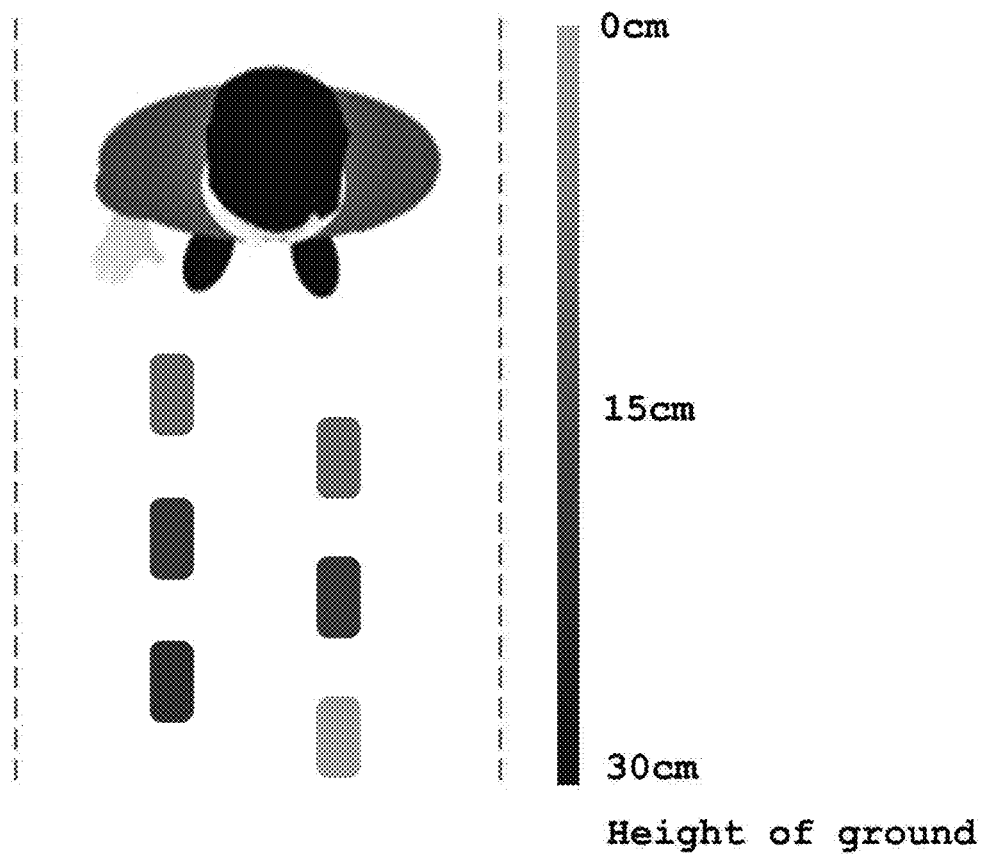
FIG. 16 illustrates an overhead view mode of an augmented reality system.

FIG. 16 illustrates an overhead view mode of the augmented reality system 1.

Referring to FIG. 16, the augmented reality system 1 may set the overhead view mode.

The overhead view mode refers to a mode where the scene is captured above the head of the user, and a synthesized image is displayed on the transparent display 110.

In other words, although not shown in the figure, a plurality of view cameras capable of capturing images in the infrared and visible region may be additionally arranged along the frame of the augmented reality glasses 100. Therefore, images captured by a plurality of view cameras may be synthesized together and provided to the eyes of the user, where a trajectory of footprints along which the user moves safely may be displayed not only during the daytime but also at nighttime, in particular. At this time, the footprint trajectory may be displayed with height information of the ground with respect to a predetermined previous position, thereby helping the user move more safely.

Also, the augmented reality system 1 is equipped with a Wi-Fi communication module and may further comprise a plurality of sensing units 300 disposed at regular intervals in the indoor environment.

A plurality of sensing units 300 may be disposed selectively so as to detect the position of the augmented reality glasses 100 in the indoor environment.

Each time a Wi-Fi hotspot signal periodically output from the augmented reality glasses 100 is detected, a plurality of sensing units 300 may transmit the detected information to the server 200, and then the server 200 may determine a relative position of the augmented reality glasses 100 with reference to the absolute position of the plurality of sensing units 300.

As described above, the proposed system obtains the current position information based on the satellite position information in the outdoor environment while obtaining the current position information by using Wi-Fi signals in the indoor environment.

Meanwhile, an additional method for obtaining current position information in the indoor and outdoor environments may be described as follows.

A method for obtaining current position information from Wi-Fi signals may be largely divided into triangulation and fingerprinting methods.

First, triangulation measures Received Signal Strengths (RSSs) from three or more Access Points (APs), converts the RSS measurements into distances, and calculates the position through a positioning equation.

Next, fingerprinting partitions an indoor space into small cells, collects a signal strength value directly from each cell, and constructs a database of signal strengths to form a radio map, after which a signal strength value received from the user's position is compared with the database to return the cell that exhibits the most similar signal pattern as the user's position.

Next, a method for collecting position data of individual smartphones by exchanging Wi-Fi signals directly and indirectly with a plurality of nearby smartphone users.

Also, since the communication module 142 of the augmented reality glasses 100 includes a Bluetooth communication module, current position information may be determined by using Bluetooth communication.

Also, according to another method, a plurality of beacons are first disposed in the indoor environment, and when communication is performed with one of the beacons, the user's position is estimated to be in the vicinity of the beacon.

Next, according to yet another method, a receiver having a plurality of directional antennas arranged on the surface of a hemisphere is disposed in the indoor environment, and the user's position is estimated through identification of a specific directional antenna that receives a signal transmitted by the augmented reality glasses 100. At this time, when two or more receivers are disposed, a 3D position of the user may also be identified.

Also, according to still another method, current position information of the user is normally determined based on the satellite position information, and when the augmented reality glasses 100 enters a satellite-denied area, speed and travel direction of the user are estimated by using the information of 9-axis sensor 143. At this time, the user's position in the indoor environment may be estimated through step counting, stride length estimation, and heading estimation. At this time, to improve accuracy of estimation, information of the user's physical condition (such as height, weight, and stride) may be received for position estimation computations. When the information of the 9-axis sensor 143 is used, accuracy of estimation information may be improved by fusing the dead-reckoning result of the 9-axis sensor 143 and the position estimation technique based on the Wi-Fi communication.

In other words, a global absolute position is computed even though the position accuracy based on the Wi-Fi technique may be somewhat low, and then a relative position with a locally high accuracy obtained through the information of the 9-axis sensor 143 is combined with the global absolute position to improve the overall position accuracy. Also, by additionally applying the Bluetooth communication, accuracy of position estimation may be further improved.

Also, according to yet still another method, since a unique magnetic field is formed for positioning in the indoor environment, a magnetic field map of each space is constructed, and the current position is estimated in a similar manner as the Wi-Fi based fingerprinting technique. At this time, a change pattern of the magnetic field generated as the user moves in the indoor environment may also be used as additional information.

Also, according to a further method, lights installed in the indoor environment may be used. In other words, while LED lights are blinked at a speed at which a human is unable to discern their on and off switching, a specific position identifier is outputted from the LED light, and the camera of the augmented reality glasses 100 recognizes the specific position identifier for position estimation.

Also, according to a still further method, images taken at various positions of the indoor environment and from various viewpoints are stored in the form of a database, and then a photograph taken at the user's current position is matched against the database, where the position is refined as various landmarks (such as a signboard, trademark, room number, or cover plate) of the indoor environment are additionally identified.

It should be noted that at least one or more indoor positioning methods have to be combined to yield the most accurate position estimate.

Also, if the computation capability and storage space of the augmented reality glasses 100 are sufficient, the augmented reality system 1 may also be configured to perform the role of the server 200 inside the augmented reality glasses 100 without involving the server 200.

Figure 17:
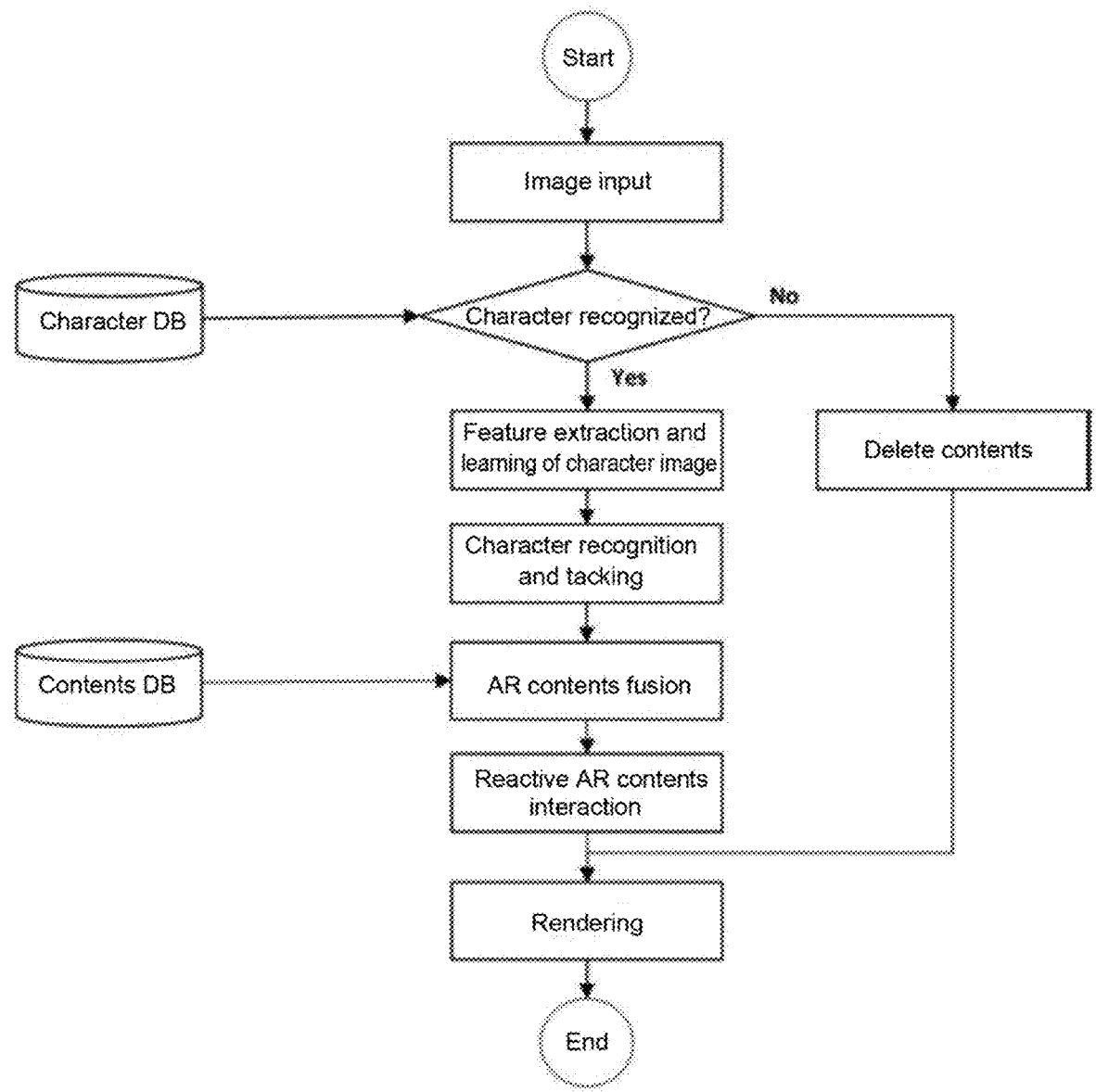
FIG. 17 is a flow diagram illustrating an operating process of an augmented reality system.

Meanwhile, referring to FIG. 17, the augmented reality system 1 according to an embodiment of the present invention may comprises a mobile terminal 100, server 200, and a plurality of sensing units 300. Here, the mobile terminal 100 may include a smartphone, tablet PC, and portable communication device that provides a touch interface. Therefore, among descriptions about the aforementioned augmented reality glasses 100, those not specific to the glasses may be applied to the mobile terminal 100.

The augmented reality system 1 according to an embodiment of the present invention may be operated to recognize handwriting of characters and manipulation of augmented reality objects.

In other words, in displaying a 3D virtual image on the display, the mobile terminal 100 displays a dotted guide along the boundary of characters displayed on the display and when handwriting is detected along the dotted guide, recognizes the characters and displays a virtual object corresponding to the content of the characters.

At this time, if the virtual object is touched, a pre-configured motion of the virtual object corresponding to the touched area may be reproduced. Also, since the mobile terminal 100 is equipped with a 9-axis sensor, the mobile terminal 100 may obtain its own 3D attitude information, and the attitude of at least one or more virtual objects selected through the mobile terminal 100 may be changed by being synchronized with the 3D attitude information.

In other words, if the user writes characters along the dotted line, the mobile terminal 100 recognizes the handwriting of characters and displays the corresponding content of the characters as an enhanced virtual object. The enhanced contents may include an image, video, 3D animation model, and voice; in the case of interactive contents, the contents may be operated to express animation, voice, or sound if the user performs a touch motion on the contents.

As described above, the mobile terminal 100 is equipped with a video camera that captures a scene in the surroundings of the user and obtains actual image information and in displaying a 3D virtual image on the display, displays the 3D virtual image corresponding to the current position information and actual image information.

And the server 200 may provide, to the mobile terminal in real-time, a 3D virtual image corresponding to the current position information and actual image information transmitted from the mobile terminal 100.

At this time, instead of directly displaying a 3D virtual image received from the server 200, the mobile terminal 100 may display characters corresponding to the name of the 3D virtual image on the display.

At this time, a dotted guide is displayed along the boundary of the characters, and if the user's handwriting is detected along the dotted guide, the mobile terminal 100 recognizes the characters and displays a virtual object corresponding to the content of the characters. At this time, if the virtual object is touched, a pre-configured motion of the virtual object corresponding to the touched area may be reproduced.

Figure 18:
FIG. 18 illustrates an example where a dotted guide is displayed along the boundary of characters.
Figure 18:
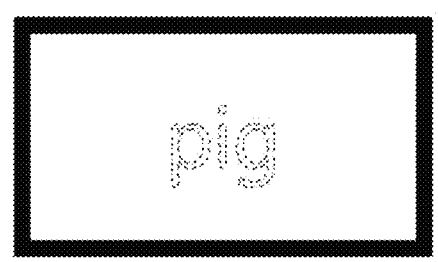
Figure 18:
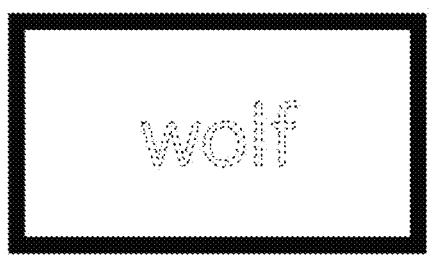
Figure 18:
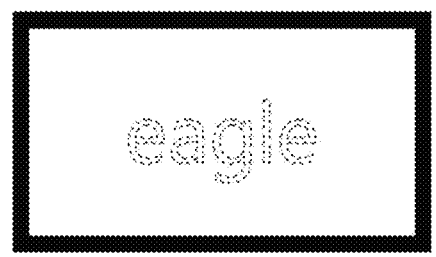

FIG. 18 illustrates an example where a dotted guide is displayed along the boundary of characters.

Referring to FIG. 18, "elephant", "pig", "wolf", and "eagle" are displayed in English on the display of the mobile terminal 100, and a dotted guide is displayed along the boundary of each character.

Therefore, if the user applies a touch motion or drawing motion using a pen along the dotted guide, namely, if handwriting is detected along the dotted guide, the mobile terminal 100 recognizes the characters and displays a virtual object corresponding to the content of the characters.

At this time, types of languages are displayed so that the various selections may be made.

In the present embodiment, English and Korean are displayed for selection, and characters in the selected language are displayed; depending on embodiments, it may be configured so that various other languages including English and Korean may be selected.

Figure 19:
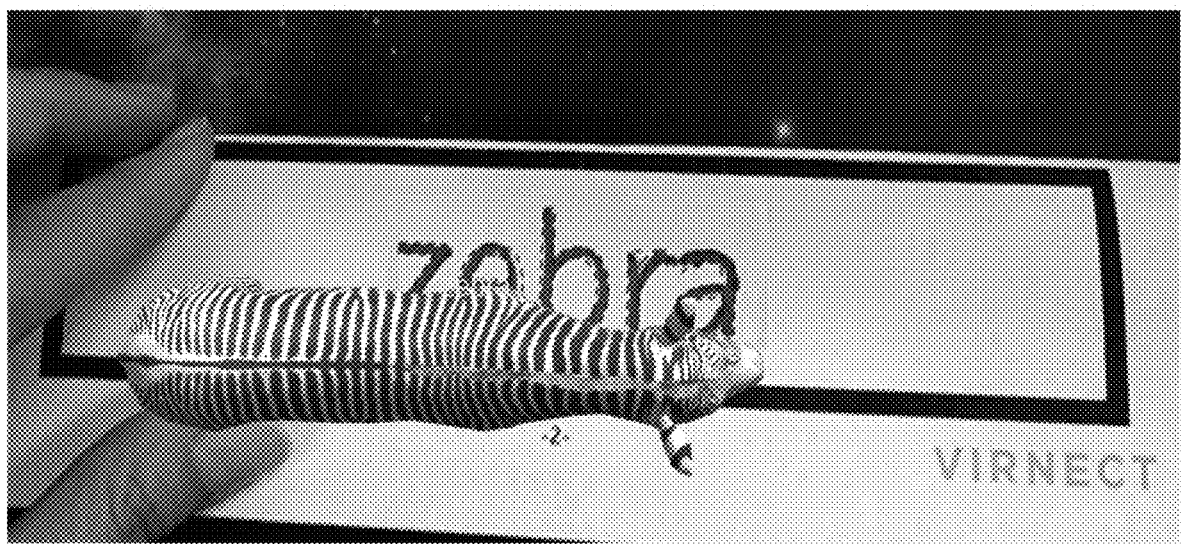
FIGS. 19 and 20 illustrate an example where, after characters are recognized, a virtual object corresponding to the content of the characters is displayed.
Figure 20:
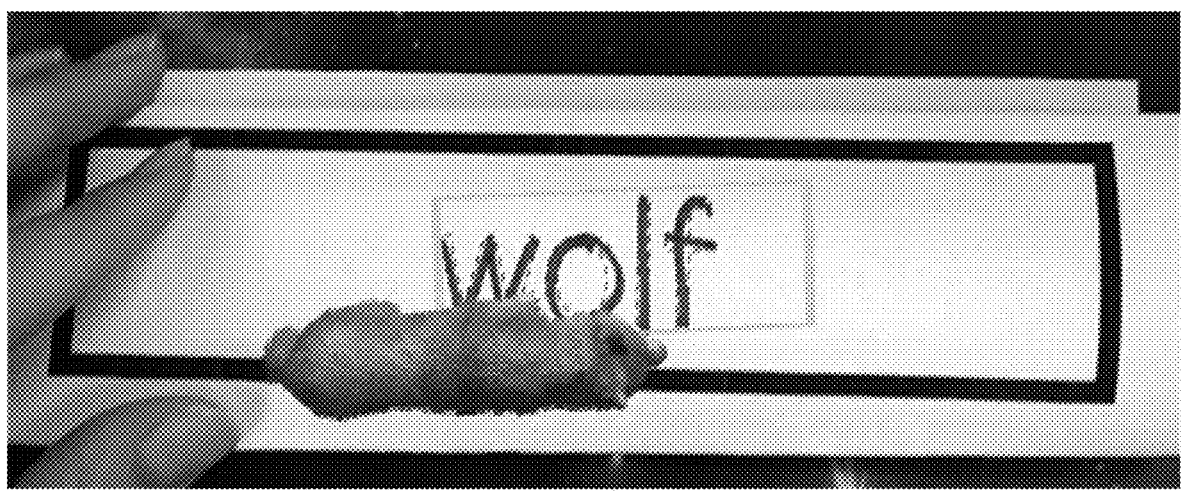

FIGS. 19 and 20 illustrate an example where, after characters are recognized, a virtual object corresponding to the content of the characters is displayed.

Referring to FIGS. 19 and 20, if handwriting of characters about zebra and wolf is detected, characters are recognized, and a virtual object corresponding to the content of the characters, namely zebra or wolf, is displayed.

At this time, if the virtual object is touched, a pre-configured motion of the virtual object corresponding to the touch area may be reproduced. For example, if the user touches the hip of the zebra, a jumping action of the zebra may be reproduced; if the user pats the head of the zebra, an action of moving the head up and down may be reproduced.

Also, while a zebra is displayed as a virtual object, if the user additionally writes characters of "love", the meaning of "love" is given to the behavior of the zebra, and a pre-configured action of the zebra corresponding to "love" may be reproduced. At this time, a dotted guide is displayed along the boundary of characters of "love".

Also, while a zebra is displayed as a virtual object, if the user touches the hip of the zebra, a jumping action of the zebra is reproduced, and at the same time, characters of "dislike" or "surprise" may be displayed.

Meanwhile, a camera capable of capturing the user's face may be additionally installed to the direction of the display in the mobile terminal 100. This camera is capable of capturing a 3D image and recognize the physical body of the user, particularly, a 3D image (depth image) of the face.

Therefore, if a body association model is set, facial expression of the user may be detected; if a smiling expression of the user is detected while a zebra is displayed as a virtual object, a pre-configured action for "joy" of the zebra may be reproduced. If a sad expression of the user is detected, a pre-configured action for "sadness" of the zebra may be reproduced.

If an angry expression of the user is detected, a pre-configured action for "anger" of the zebra may be reproduced.

Through the augmented reality system 1 capable of recognizing handwriting of characters and operating an augmented reality object, children may learn by utilizing 3D type, multi-sensory information.

Children may express and develop their senses in a way of seeing, hearing, or feeling, where the present invention lets the children immersed with sensory feelings with respect to information by improving their perception capability through a multi-sensory expression method.

Figure 21A:
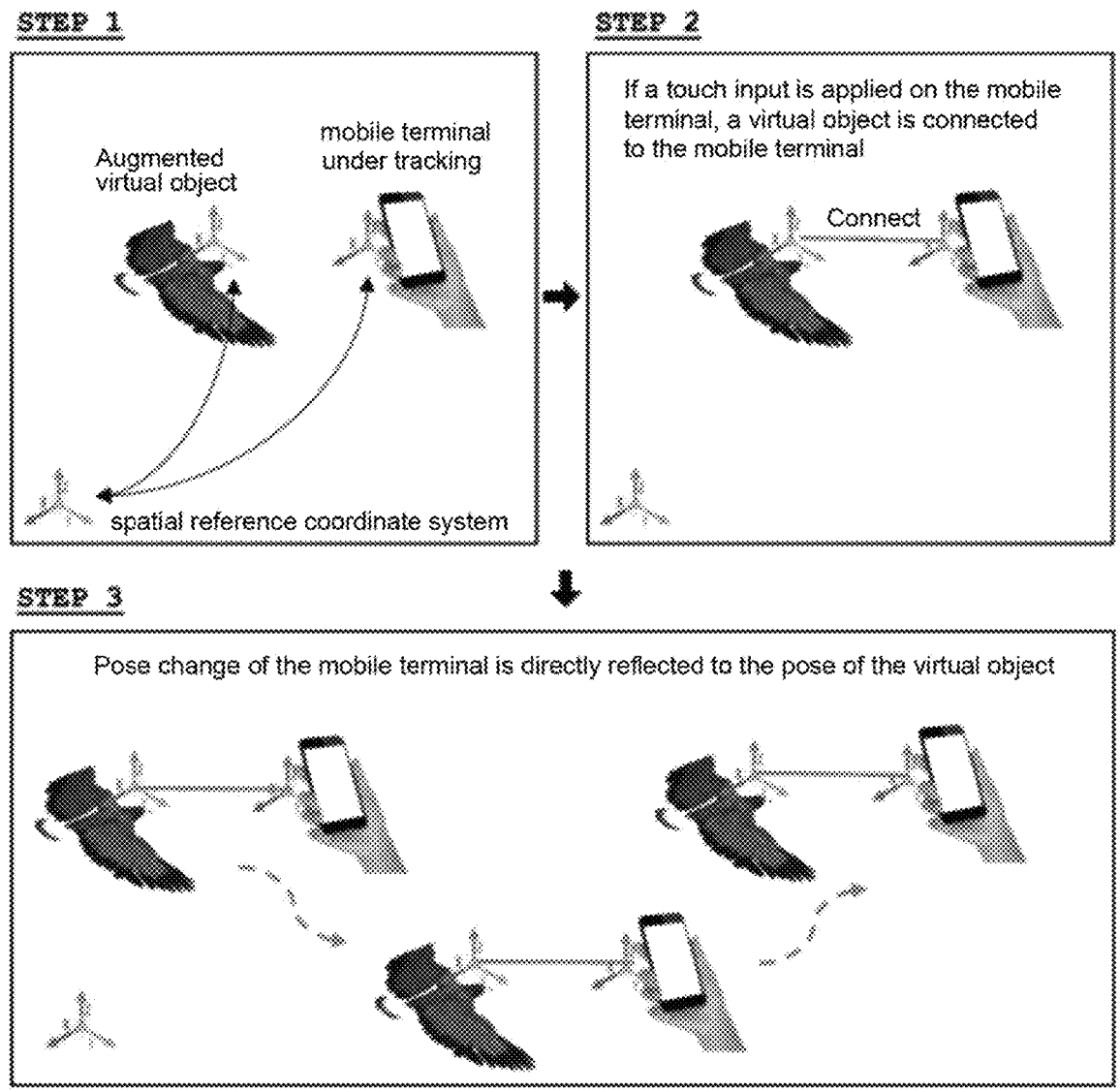
FIGS. 21a and 21b illustrate an example where a virtual object is moved in an augmented reality system.
Figure 21B:
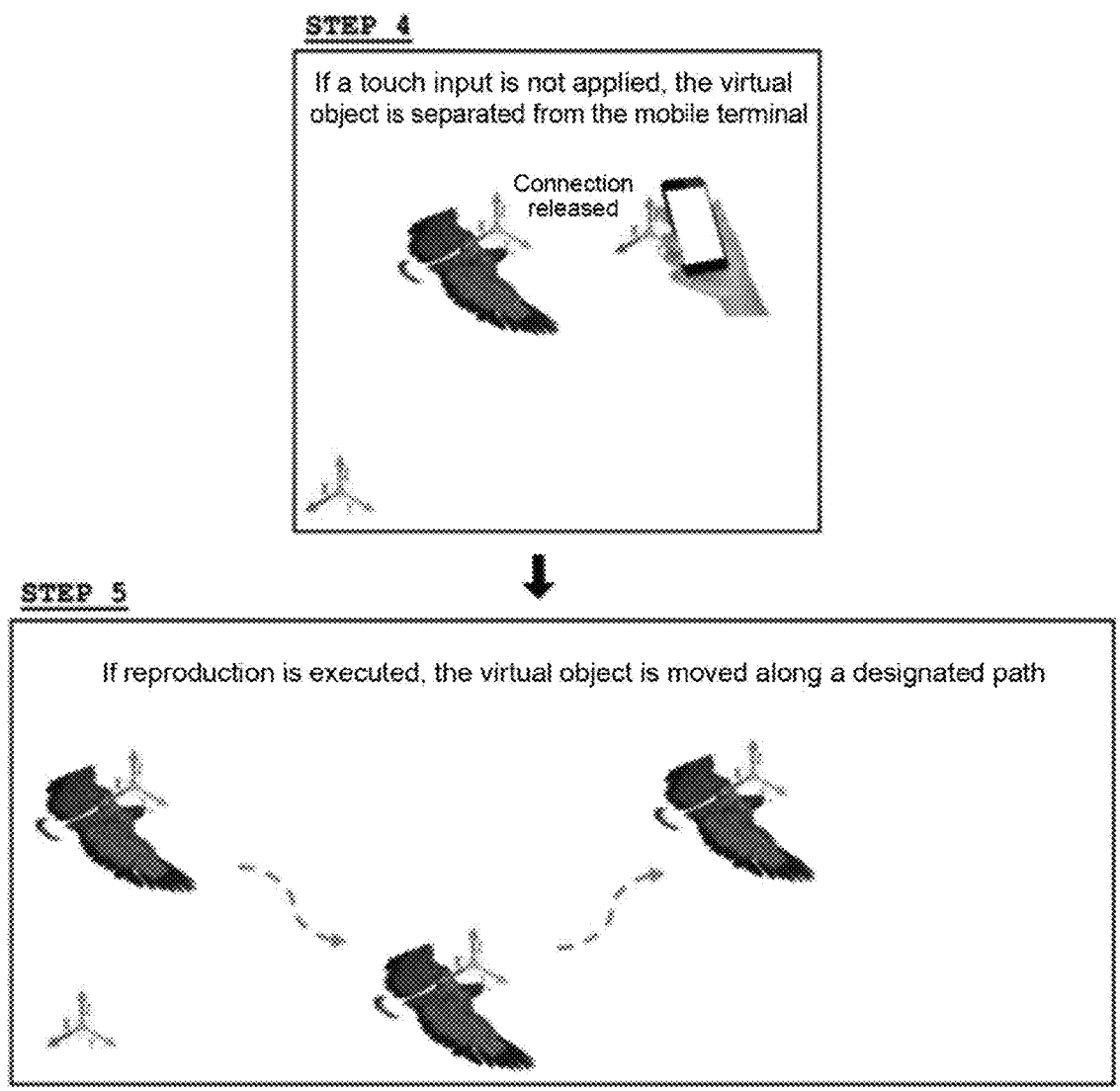

FIGS. 21*a* and 21*b* illustrate an example where a virtual object is moved in the augmented reality system 1.

Referring to FIGS. 21*a* and 21*b*, in the step 1, virtual objects are enhanced in the space with respect to a spatial coordinate system and displayed on the display of the mobile terminal 100.

In the step 2, the user selects a virtual object. If the user touches one or more virtual objects displayed on the display (touchscreen), the selected virtual object is connected to the mobile terminal 100. Here, connection implies that the reference coordinate system of the virtual object has been changed from the spatial coordinate system to the coordinate system of the mobile terminal 100.

In the step 3, while the virtual object is being touched, if the mobile terminal 100 is moved or rotated, translation or rotation information of the virtual object connected to the mobile terminal 100 is changed in 3D by being synchronized with the 3D motion of the mobile terminal 100.

In the step 4, if the user does not touch the virtual object, the virtual object is separated from the mobile terminal 100. Here, separation implies that the reference coordinate system of the virtual object has been changed from the coordinate system of the mobile terminal 100 to the spatial coordinate system.

In the step 5, a video showing attitude change of the virtual object in synchronization with the 3D pose information of the mobile terminal 100 is stored for reproduction afterwards. In other words, if a video showing attitude change of the virtual object is stored, the recorded information may be retrieved and reproduced by pressing a play button afterwards.

In the step 2 to step 4 of the example above, only when the virtual object is in a touched state, the reference coordinate system of the touched virtual object is changed from the spatial coordinate system to the coordinate system of the mobile terminal 100, and the virtual object is moved in conjunction with the 3D motion of the mobile terminal 100.

Depending on embodiments, if the user touches a virtual object for more than a predetermined time period, the virtual object may be selected, and if the virtual object is touched again for more than a predetermined time period, selection of the virtual object may be released.

Figure 22:
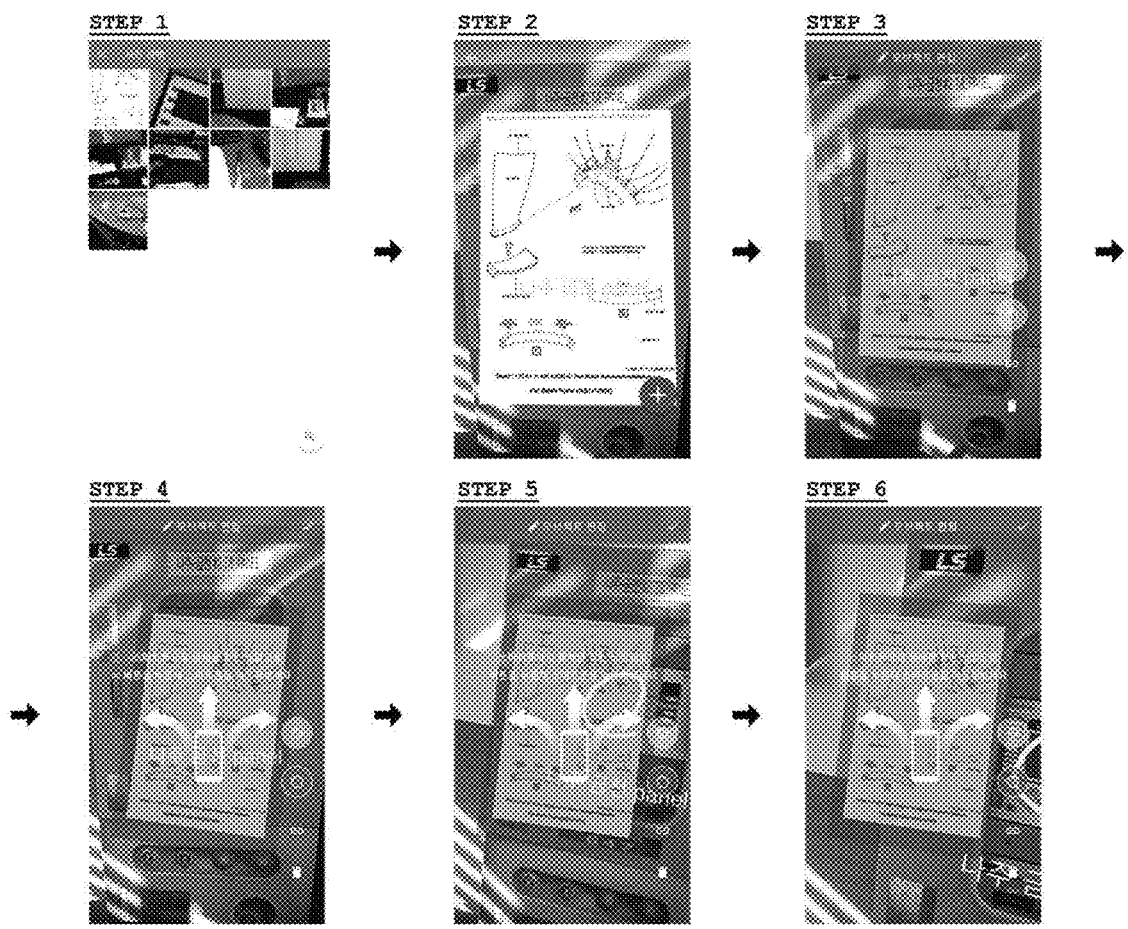
FIG. 22 illustrates another example where a virtual object is moved in an augmented reality system.

FIG. 22 illustrates another example where a virtual object is moved in the augmented reality system 1.

Referring to FIG. 22, if the mobile terminal 100 loads augmented reality contents and displays a virtual object, the user selects the virtual object and changes the coordinate system of the corresponding virtual object to the mobile coordinate system. Afterwards, the selected virtual object is moved in conjunction with the 3D motion of the mobile terminal 100.

Figure 23:
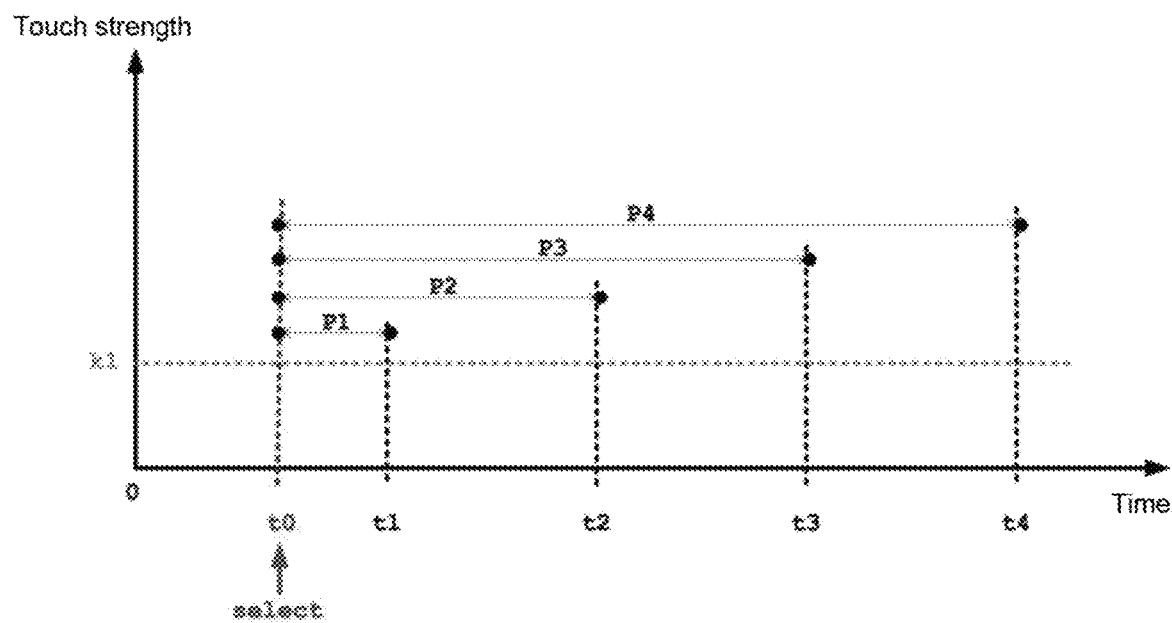
FIG. 23 illustrates a condition for selecting a virtual object in an augmented reality system.

FIG. 23 illustrates a condition for selecting a virtual object in the augmented reality system 1.

Referring to FIG. 23, in order for the user to select a virtual object displayed on the display of the mobile terminal 100, the method described above may be applied, where, if the user touches the virtual object for more than a predetermined time period t0, the virtual object is selected, and if the user touches the virtual object again for the predetermined time period t0, selection of the virtual object is released.

At this time, it is preferable that a touch input period for a virtual object is considered to be valid only when the display is touched with more than predetermined pressure k1.

In other words, if the user touches a virtual object for more than a predetermined time period t0, the virtual object is selected, the reference coordinate system of the virtual object is changed from the spatial coordinate system to the coordinate system of the mobile terminal 100, and the virtual object is moved in conjunction with a 3D motion of the mobile terminal 100.

At this time, according to the duration of the touch after the virtual object is touched for more than a predetermined time period t0, the time period for storing a video showing attitude change of the virtual object may be automatically configured.

As shown in FIG. 23, when the user continues to touch a virtual object until a first time t1 after having touched the virtual object up to more than a predetermined time t0, a storage time period P1 ranging from the predetermined time t0 to the first time t1 is automatically configured. Therefore, as duration of touch on the virtual object is made longer, the storage time period becomes further elongated, where the storage time period is set as a multiple of the touch duration. At this time, the storage time period is counted from the initial movement of the virtual object.

At this time, the automatically configured storage time is displayed in the form of a time bar on the display, and estimated time to completion is displayed in real-time. At this time, if the user drags the time bar to the left or right, the estimated time is increased or decreased. In other words, the automatically configured storage time may be increased or decreased according to the dragging motion of the user.

If a dotted guide is displayed along the boundary of displayed characters, and handwritten characters are detected along the dotted guide, the augmented reality system according to the embodiment of the present invention may recognize the characters and display a virtual object corresponding to the content of the characters.

In other words, with a dotted guide provided, a user may practice handwriting, and since the character fonts of the dotted guide is predefined, character recognition rate is high.

In particular, unlike adults, since children from 0 to 5 years old recognize characters as an object, namely a picture or a chunk rather than characters, they may learn characters irrespective of a specific character font. Writing may be associated with drawing or painting, which may lead to learning. Also, children may learn by utilizing 3D type, multi-sensory information. Children may express and develop their senses in a way of seeing, hearing, or feeling, where the present invention lets the children immersed with sensory feelings with respect to information by improving their perception capability through a multi-sensory expression method.

Here, immersion with sensory feelings refers to how much a user's attention is immersed in the information of a virtual world as shown before the eyes of the user; for example, when an object is enhanced with augmented reality, children tend to pay attention to the object and to observe the complete shape of the object, touch the screen by using their finger or move a camera. By providing a reality-type interface through which children manipulate virtual objects from a specific drawing activity (writing activity), a particular activity is naturally motivated in a learning environment, and thereby children may concentrate on the learning itself.

Also, since a pose of at least one or more selected virtual objects is changed in synchronization with 3D pose information of a mobile terminal, the augmented reality system 1 according to an embodiment of the present invention may change the pose of the virtual object in a variable way with a minimum amount of actions.

Also, by using 3D translation/rotation information of a mobile terminal, the augmented reality system 1 of the present invention may translate/rotate the selected virtual object in 3D. In other words, a virtual object may be easily translated/rotated through a pose change of a mobile terminal without switching between a translation and rotation operation modes nor without having to touch a touchscreen (display) many times.

Also, the augmented reality system 1 of the present invention enables to record the motion of a virtual object and store and reproduce the motion, thereby increasing utilization such as augmented reality animation.

Also, the augmented reality system 1 according to an embodiment of the present invention may capture a manipulation video of a process where a user operates a physical object in an augmented reality manual generation mode; and display the manipulation video as an augmented reality superimposed on a physical object in an augmented reality manual execution mode. in an augmented reality manual execution mode. Therefore, the present invention provides an advantage that anyone may easily produce and distribute an augmented reality manual.

Also, the augmented reality system 1 according to an embodiment of the present invention automatically adjusts the amount of information of a virtual object dynamically according to the distance between a physical object and a user; therefore, the user may check the information of a desired virtual object conveniently.

Therefore, when a virtual object is displayed in the form of an augmented reality advertisement, a time period during which a user concentrates on the corresponding virtual object is lengthened, and thereby an advertisement effect may be increased.

Also, the augmented reality system 1 according to an embodiment of the present invention may determine an additional recognition area and identify similar objects by assigning unique identifiers to the respective physical objects based on an image difference of the additional recognition area. Also, the augmented reality system may identify physical objects by taking into account all of the unique identifiers assigned to the respective physical objects based on the image difference of the additional recognition area and current position information of each physical object.

Therefore, even if physical objects with a high similarity are arranged, the physical objects may be identified, virtual objects assigned to the respective physical objects may be displayed, and thereby unambiguous information may be delivered to the user.

As described above, it is apparent for those skilled in the art that the present invention may be embodied in other specific forms without changing the technical principles or essential characteristics of the present invention. Therefore, the embodiments described above should be regarded as being illustrative rather than restrictive in every aspect. The technical scope of the present invention should be determined by the appended claims given below rather than the detailed descriptions above, and it should be understood that the implications and scope of the appended claims and all of the modifications or modified forms that are derived from an equivalent concept of the present invention belong to the technical scope of the present invention.

An augmented reality system according to an embodiment of the present invention may capture a manipulation video of a process where a user operates a physical object in an augmented reality manual generation mode; and display the manipulation video as an augmented reality superimposed on a physical object in an augmented reality manual execution mode.

Therefore, the present invention provides an advantage that anyone may easily produce and distribute an augmented reality manual.

An augmented reality system according to an embodiment of the present invention may determine an additional recognition area and identify similar objects by assigning unique identifiers to the respective physical objects based on an image difference of the additional recognition area.

Also, the augmented reality system may identify physical objects by taking into account all of the unique identifiers assigned to the respective physical objects based on the image difference of the additional recognition area and current position information of each physical object.

Also, an augmented reality system according to an embodiment of the present invention may display a virtual object assigned to a physical object at a target position by identifying the physical object correctly even if the physical object is not contained or partially contained in a captured image.

Also, an augmented reality system according to an embodiment of the present invention automatically adjusts the amount of information of a virtual object dynamically according to the distance between a physical object and a user; therefore, the user may check the information of a desired virtual object conveniently.

Also, an augmented reality system according to an embodiment of the present invention automatically adjusts positions of objects by considering a relative position relationship between a physical and virtual objects so that objects are not overlapped with each other; therefore, a user may conveniently check the information of a desired virtual object.

Therefore, when a virtual object is displayed in the form of an augmented reality advertisement, a time period during which a user concentrates on the corresponding virtual object is lengthened, and thereby an advertisement effect may be increased.

Also, if a dotted guide is displayed along the boundary of displayed characters, and handwritten characters are detected along the dotted guide, an augmented reality system according to an embodiment of the present invention may recognize the characters and display a virtual object corresponding to the content of the characters.

In other words, with a dotted guide provided, a user may practice handwriting, and since the character fonts of the dotted guide is predefined, character recognition rate is high.

In particular, unlike adults, since children from 0 to 5 years old recognize characters as an object, namely a picture or a chunk rather than characters, they may learn characters irrespective of a specific character font. Writing may be associated with drawing or painting, which may lead to learning. Also, children may learn by utilizing 3D type, multi-sensory information. Children may express and develop their senses in a way of seeing, hearing, or feeling, where the present invention lets the children immersed with sensory feelings with respect to information by improving their perception capability through a multi-sensory expression method.

Also, since a pose of at least one or more selected virtual objects is changed in synchronization with 3D pose information of a mobile terminal, an augmented reality system according to an embodiment of the present invention may change the pose of the virtual object in a variable way with a minimum amount of actions.

Also, by using 3D translation/rotation information of a mobile terminal, the augmented reality system of the present invention may translate/rotate the selected virtual object in 3D. In other words, a virtual object may be easily translated/rotated through a pose change of a mobile terminal without switching between a translation and rotation operation modes nor without having to touch a touchscreen (display) many times.

Also, the augmented reality system of the present invention enables to record the motion of a virtual object and store and reproduce the motion, thereby increasing utilization such as augmented reality animation.

Also, since the augmented reality system of the present invention enables at least one or more selected virtual objects to change their pose in synchronization with 3D pose information of a mobile terminal, a virtual object may be manipulated to have various poses with a minimum amount of actions.

Also, a selected virtual object may be translated/rotated in 3D by using 3D translation/rotation information of a mobile terminal. In other words, a user may conveniently manipulate a virtual object to be translated/rotated through a pose change of the mobile terminal without converting the translation mode to the rotation mode or vice versa nor touching a touchscreen (display) many times.

What is claimed is:

1. An augmented reality method capable of manipulating an augmented reality object using a system, wherein the system comprises:
   a mobile terminal having a display area displaying a 3D virtual image about a virtual object; and
   a server providing the 3D virtual image to the mobile terminal,
   the method comprising:
   providing a current position information and an actual image information of the mobile terminal to the server;
   generating the 3D virtual image corresponding to a current position information and an actual image information based on a spatial coordinate system in the server;
   providing the 3D virtual image to the mobile terminal;
   displaying first characters corresponding to the name of the virtual object on the display area of the mobile terminal, wherein each of the first characters has a double dotted guide line along a boundary of the first character;
   if the mobile terminal detects a user's handwriting in the double dotted guide lines of the first characters,
   recognizing the first characters corresponding to the detected handwriting;
   displaying the 3D virtual image of the virtual object which has the recognized first characters as name in form of a 3D virtual image on the mobile terminal, wherein the 3D virtual image displayed on the mobile terminal is changed from the spatial coordinate system to the coordinate system of the mobile terminal,
   if the 3D virtual image is touched by the user while the 3D virtual image is displayed in the display area of the mobile terminal,
   reproducing a pre-configured motion of the 3D virtual image of the virtual object, wherein the pre-configured motion is performed in an area corresponding to a touched area of the 3D virtual image;
   if second characters are displayed on the 3D virtual image while the 3D virtual image is displayed in the display area of the mobile terminal, and then the mobile terminal detects an additional handwriting corresponding to second characters,
   recognizing the second characters corresponding to the additional handwriting detected by the mobile terminal; and
   displaying a pre-configured action of the 3D virtual image according to meaning represented by the recognized second characters;
   if second characters are displayed on the 3D virtual image while the 3D virtual image is displayed in the display area of the mobile terminal, and then the mobile terminal detects an additional handwriting corresponding to second characters,
   recognizing the second characters corresponding to the additional handwriting detected by the mobile terminal; and
   displaying a pre-configured action of the 3D virtual image according to meaning represented by the recognized second characters;
   if a camera of the mobile terminal captures a user's face and detects facial expression of the captured face,
   recognizing feelings from the expression; and
   reproducing a pre-configured action of the 3D virtual image in response to the feelings,
   if the mobile terminal is moved or rotated in 3D while the 3D virtual image is touched by the user,
   displaying the 3D virtual image changed in 3D by being synchronized with the 3D motion of the mobile terminal when the user touches the 3D virtual image for more than a predetermined time period; and
   automatically storing a video showing attitude change of the 3D virtual image when the 3D virtual image is touched by the user up to more than the predetermined time period;
   if the 3D virtual image is not touched by the user,
   displaying the 3D virtual image based on the spatial coordinate system generated in the server on the display area of the mobile terminal regardless of the 3D motion of the mobile terminal.

2. The method of claim 1, wherein the detected handwriting is a touch motion or drawing motion of the user input along the double dotted guide line.

3. The method of claim 1, wherein the mobile terminal is equipped with a 9-axis sensor and obtains its own 3D pose information, and the pose of at least one or more 3D virtual images selected through the mobile terminal is changed by being synchronized with the 3D pose information.

4. The method of claim 1, wherein a storage time storing the video is from the predetermined time period to a time touched by the user after the predetermined time period.

5. The method of claim 4, wherein the storage time is displayed in the form of a time bar on the display area when the stored video is displayed on the mobile terminal.

* * * * *